US007770892B2

(12) United States Patent
Seelig et al.
(10) Patent No.: US 7,770,892 B2
(45) Date of Patent: *Aug. 10, 2010

(54) GAMING DEVICE WITH ACTION UNIT AND PRIZE OBJECT DISPLAYS AND METHOD OF USE

(75) Inventors: Jerald C. Seelig, Pleasantville, NJ (US); Lawrence M. Henshaw, Pleasantville, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 199 days.

This patent is subject to a terminal disclaimer.

(21) Appl. No.: 11/828,720

(22) Filed: Jul. 26, 2007

(65) Prior Publication Data

US 2008/0182643 A1 Jul. 31, 2008

Related U.S. Application Data

(63) Continuation-in-part of application No. 11/138,934, filed on May 25, 2005, now Pat. No. 7,335,103, and a continuation-in-part of application No. 10/883,489, filed on Jun. 30, 2004, now Pat. No. 7,258,610.

(60) Provisional application No. 60/820,424, filed on Jul. 26, 2006.

(51) Int. Cl.
*G07F 17/34* (2006.01)
*A63F 13/00* (2006.01)

(52) U.S. Cl. .............................. 273/144 B; 273/144 R; 273/143 R; 273/138.2; 463/20; 463/17; 463/22; 463/25

(58) Field of Classification Search ............. 273/144 R, 273/144 A, 144 B, 143 R, 138.1, 138.2; 463/17, 463/20, 22, 25–27
See application file for complete search history.

(56) References Cited

U.S. PATENT DOCUMENTS

| | | | |
|---|---|---|---|
| 4,448,419 | A | 5/1984 | Telnaes |
| 4,871,171 | A | 10/1989 | Rivero |
| 5,380,007 | A | 1/1995 | Travis et al. |
| 5,456,465 | A | 10/1995 | Durham |

(Continued)

FOREIGN PATENT DOCUMENTS

| | | | |
|---|---|---|---|
| FR | 2699309 | A1 * | 6/1994 |

*Primary Examiner*—Benjamin H Layno
(74) *Attorney, Agent, or Firm*—Ian F. Burns & Associates, P.C.

(57) ABSTRACT

A gaming device having a container configured to hold a plurality of display objects, an agitator for moving the plurality of display objects, a prize object holder configured to hold a plurality of prize objects in an individually controlled manner, a prize object display located inside of the container and configured to receive at least one prize object from the prize object holder, and a controller configured to select a prize object from the prize object holder and cause the selected prize object to be displayed in the prize object display, is disclosed. In one embodiment, the prize object display includes a tubular exhibition container. In another embodiment, the display object container of the gaming device is configured to provide a jumbled ball display. In addition, a method for playing a game by providing the prize object display inside of the display object container of the aforementioned gaming device is disclosed.

33 Claims, 24 Drawing Sheets

U.S. PATENT DOCUMENTS

| | | | |
|---|---|---|---|
| 5,799,940 | A | 9/1998 | Tripp |
| 5,848,932 | A | 12/1998 | Adams |
| 6,338,678 | B1 | 1/2002 | Seelig et al. |
| 2004/0002373 | A1 | 1/2004 | Kaminkow |

* cited by examiner

FIG. 15E
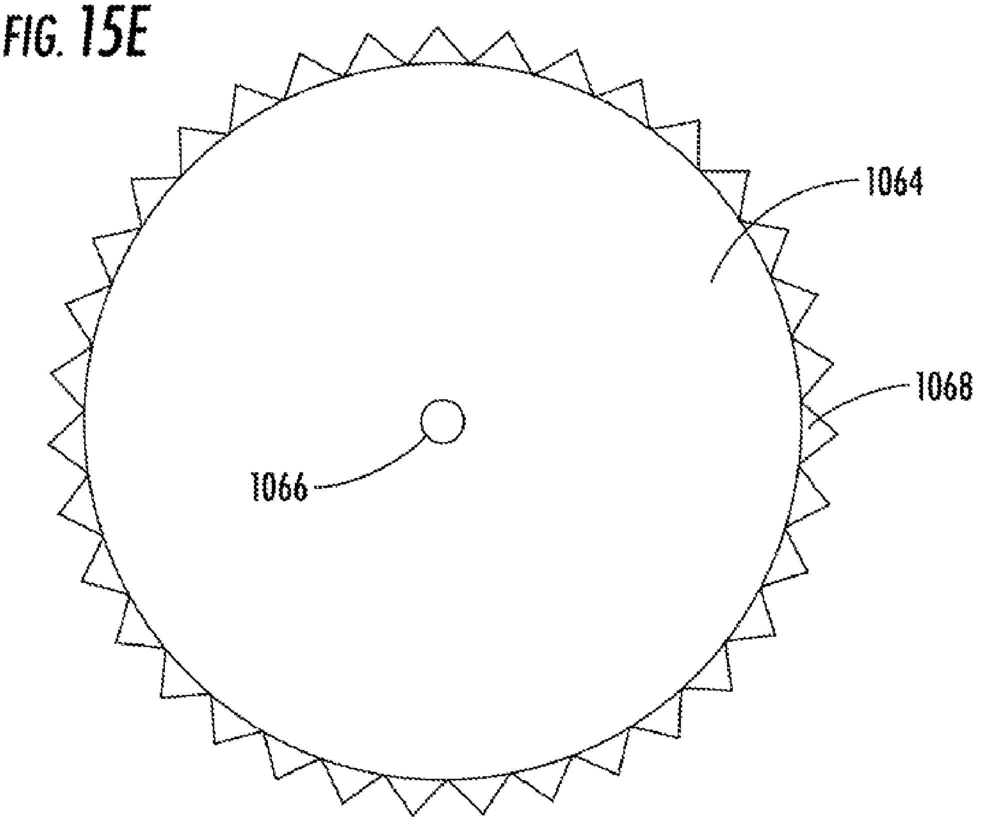
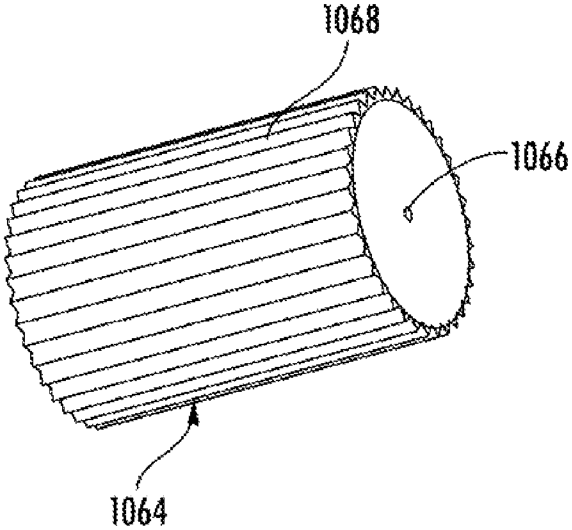
FIG. 15F

GAMING DEVICE WITH ACTION UNIT AND PRIZE OBJECT DISPLAYS AND METHOD OF USE

CROSS REFERENCES TO RELATED APPLICATIONS

This application is a continuation-in-part application of U.S. patent application Ser. No. 10/883,489 filed Jun. 30, 2004. This application is also a continuation-in-part application of U.S. patent application Ser. No. 11/138,934 filed May 25, 2005. This application also claims priority to U.S. provisional application No. 60/820,424 filed Jul. 26, 2006. All of the above referenced applications are hereby expressly incorporated by reference in their entireties.

BACKGROUND OF THE INVENTION

The present invention relates to a gaming device and a method of use. More specifically, the gaming device includes a container of display objects with a separate prize object display also positioned within the container.

Gaming Devices

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number. The random number may then be compared to a predefined table to determine the outcome of the event. If the random number falls within a certain range of numbers on the table, the player may win a predefined prize. The table may also contain display information that allows the gaming device to generate a display that corresponds to the outcome of the game. The gaming device may present the outcome of the game on a large variety of display devices, such as mechanical spinning reels or video screens.

Bonus Prizes

Some gaming devices award bonuses in addition to prizes that are awarded in the primary game. A bonus can be defined as an additional prize that is awarded to the player when a predefined event occurs. An example of a bonus game can be found in U.S. Pat. No. 5,848,932 issued to Adams. One of the gaming devices described in this document comprises three spinning reels and a spinning wheel bonus display. When predetermined indicia are displayed on the spinning reels of the primary game, the wheel can be activated to indicate a bonus prize. The bonus prize is awarded in addition to any prizes awarded in the primary game.

Generally, bonus prizes are offered in such games in order to increase the excitement and enjoyment experienced by players. This attracts more players to the game and encourages players to play longer. When gaming devices attract more players and the players play longer, they tend to be more commercially successful relative to other gaming devices.

Display Devices

In addition, highly visible display devices are utilized on gaming devices in order to attract players. Once players are attracted to the gaming device, they tend to play longer because the display device enhances the stimulation and excitement experienced by players. It is, therefore, desirable for gaming devices to incorporate highly visible display devices.

The applicants believe that display devices tend to be more successful if they are a derivation of a well-known game or theme. They are more successful because players tend to be drawn to games that they instantly recognize. Many players are reluctant to try completely new games because they must spend time to learn the new game. It is, therefore, desirable to provide display devices that are based on well-known games or themes.

The applicants also believe that display devices also tend to be more successful if they utilize physical objects rather than simulations. Although video devices and electronic signs can be used for display devices, players are more attracted to display devices that utilize physical objects. Physical objects can be even more effective display devices if they are movable and they are used in combination with lights and sounds.

U.S. Patent Application Publication No. 2004/0002373 appears to disclose a gaming device involving a display area with a plurality of aligned channels, each channel containing a movable object, an actuator at the base of each channel and a partitioner for dividing each channel into a plurality of sections. However, the disclosed gaming device does not provide for holding the objects in an individually controlled manner in an area separate from the channels before engagement with the actuator. Thus, the disclosed device does not allow for the increased control and ease of operation accrued to the game operator by the gaming devices of the present invention where (i) the prize objects are held in an individually controlled manner in a prize object holder separate from the display container and (ii) one prize object can be selected from a plurality of different prize objects for placement into the prize display.

Jumbled Ball Displays

Two references that disclose use of jumbled ball displays are U.S. Pat. No. 4,871,171 issued to Rivero and U.S. Pat. No. 5,380,007 issued to Travis et al. Rivero appears to disclose a game device with means for simulating the release of a ball. In this reference, a rotating drum 2 is provided with numbered balls 17. As the drum rotates, a ball is released into a transparent tube 16.

However, Rivero is not intended to show the player the ball that is released from the drum. Rather, the ball is held in the tube, out of view of the player, and an electronic reproduction of the ball number is presented in a window 9. This is intended to give the player "the impression" that the ball has been counted. Rivero fails to disclose or suggest displaying actual balls to the player to indicate the outcome of the game or the value of a prize. In addition, in the Rivero device the balls are in a cage and quite exposed to the environment and tampering. The ball cage of Rivero is also mounted on the front side and well below the top of the gaming machine, hiding the ball cage from view of potential game players who are not in position to see the front side of the machine.

Travis et al. appear to disclose a video lottery gaming device with numbered balls 48. However, all of the balls are reproductions generated by software and no physical balls are displayed to the player. Travis et al. also fails to disclose or suggest displaying actual balls to the player to indicate the outcome of the game or the value of a prize.

One of the disadvantages with Rivero and Travis et al. is that no actual physical balls are used to display the outcome of a game. This is less desirable because players like to see physical objects rather than electronic reproductions of the physical objects. Moreover, players tend to believe that a game device is misleading when the device purports to display a reproduction of an object rather than the object itself.

This is especially true when the object itself is supposedly available for viewing, as is the case in Rivero.

BRIEF SUMMARY OF THE INVENTION

The present invention provides a gaming device comprising a plurality of display objects; a container configured to hold the plurality of display objects wherein at least a portion of the container is sufficiently transparent to allow a player to view contents of the container; an agitator configured to agitate the plurality of display objects; a plurality of prize objects; at least one prize object holder configured to hold the prize objects in an individually controlled manner; at least one prize object display located inside of the container and configured to receive at least one prize object from the prize object holder; and a controller in communication with the prize object display wherein the controller is configured to select a prize object from the prize object holder and cause the selected prize object to be displayed in the prize object display. Gaming devices of the present invention may further comprise (in addition to that described above): a prize object actuator associated with the prize object holder; a player input device; prize object displays including segmenting mechanisms or sensors; agitators including display object transport devices.

The present invention further provides a gaming device having a plurality of display object means for entertaining a player; container means for holding the display object means and providing the player with a view of the contents of the container means; a plurality of prize object means for at least partially conveying a game outcome to the player; prize object holding means for storing the prize object means in an individually controlled manner; and prize object display means for displaying a selected prize object means inside of the container means to convey the game outcome to the player.

The present invention also provides a method of playing a game comprising the following steps, but not all necessarily in the order listed: providing a plurality of display objects in a container; storing a plurality of prize objects in an individually controlled manner; providing a prize object display located inside of the container; configuring the container to allow a player to view the contents of the container; agitating the plurality of display objects in the container; and determining a random game outcome and communicating the random game outcome to the player by selecting at least one of the plurality of prize objects and displaying the selected prize object in the prize object display.

For purposes of the present invention, “determining (or determination of) a game outcome” shall mean actively causing, deciding, dictating, choosing, selecting or affecting the outcome of the game. This is in contrast to detecting, learning, identifying, discovering, ascertaining or finding out the result of the game outcome.

The above description sets forth, rather broadly, a summary of some embodiments of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

The various embodiments of the present invention may, but do not necessarily, achieve one or more of the following advantages:

the ability to provide game players with a more exciting and desirable gaming experience;

the ability to attract more patrons to play a game;

provide longer play times and a greater payout possibility for a player;

provide greater revenues for gaming operators;

provide a gaming device that utilizes a visually appealing and highly visible display device;

provide a gaming device including a transport device occupying a minimal amount of space; and provide a gaming device where display objects and prize objects may be displayed within the same container but where the display objects and prize objects remain separated from one another.

These and other advantages may be realized by reference to the remaining portions of the specification, claims and abstract.

BRIEF DESCRIPTION OF THE DRAWINGS

FIG. 15E is a cross-sectional view of another embodiment of a transport device useful in the present invention.

FIG. 15F is a front perspective view of the transport device in FIG. 15E.

DETAILED DESCRIPTION OF THE INVENTION

In the following detailed description of various embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

In the Detailed Description below, the applicants utilize various spatially orienting terms such as "upper," "lower," "horizontal" and "vertical." It is to be understood that these terms are used for ease of description of the various embodiments with respect to the drawings but are not necessarily in themselves limiting or requiring of an orientation as thereby described in the following Detailed Description.

Figure 1A:
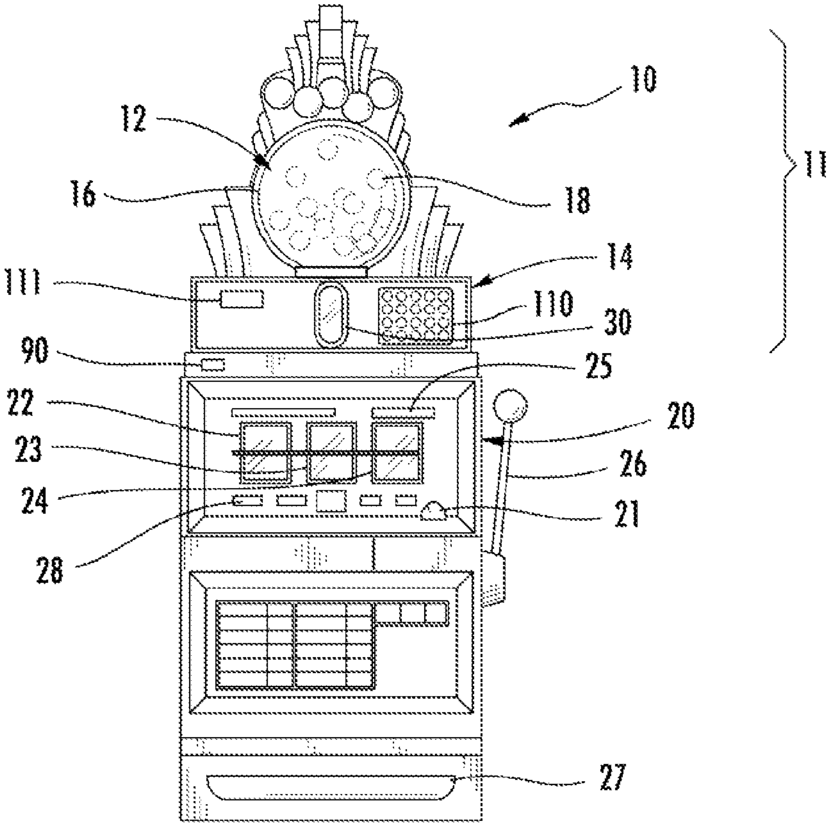
FIG. 1A is substantially a front view of a gaming device useful in the present invention.

As seen in FIG. 1A, one embodiment disclosed herein comprises a gaming device, generally indicated by reference number 10. Gaming device 10 comprises a display device 11 and a game apparatus 20. Display device 11 may comprise a jumbled ball display 12 and a prize display 14. Display device 11 may also include display window 30, player input device 90, display 110 and dispenser 111.

Game Apparatus

With continuing reference to FIG. 1A, game apparatus 20 may be any of a large number of devices that are configured to allow players to play a game. For example, game apparatus 20 may utilize reel displays, such as spinning reels 22-24 or a video display (not shown), to display outcomes of the game. Means may also be provided for accepting wagers, such as a coin slot 21 or card reader 25, and for awarding prizes, such as a coin dispenser 27. A handle 26 and button 28 are provided for activating game apparatus 20 to begin a game. In at least one embodiment, game apparatus 20 may be an S Plus™ model gaming device manufactured by International Game Technology in Reno, Nev.

Game apparatus 20 is typically controlled by an electronic controller 82 (see FIG. 2A) that utilizes a random number generator. The random number generator produces a random or pseudo random number for each game. The outcome of the game may be determined by comparing the random number to a table of outcomes stored in a memory and accessed by controller 82. A number of different tables of outcomes may be used and different tables may be used for different games. The tables can be designed so that different prizes have different probabilities of being awarded. Such design techniques are well known in gaming. Examples of such designs are shown in U.S. Pat. No. 4,448,419, issued to Telnaes, and U.S. Pat. No. 5,456,465, issued to Durham. Controller 82 causes spinning reels 22-24 of the video display to show the outcome of the game that corresponds to the outcome of the random number generator. It is understood that game apparatus 20 may operate in many other ways and still achieve the objects of the present invention.

Game apparatus 20 may also be capable of producing a bonus-activating event. This event may be many different types of events. For example, a bonus-activating event may comprise displaying a particular symbol, such as a "bonus" symbol, or combination of symbols, such as three "7" symbols, on reels 22-24. If the game being played is poker based, the bonus-activating event may be occurrence of a certain hand, such as a royal flush. Furthermore, a bonus-activating event may occur when a player accumulates a number of symbols or game outcomes over a number of separate game plays. For example, a bonus-activating event may occur when the player receives three "bonus" symbols during a period of time. The bonus-activating event may be based on an external event. For example, a bonus-activating event may occur when a group of players obtain a certain result.

Jumbled Ball Display

With continuing reference to FIG. 1A, jumbled ball display 12 comprises a container 16 that is configured to hold a plurality of display objects 18, in this case shown as display balls or action units. Container 16 is at least partially transparent allowing players to view display objects 18 inside of the container. Container 16 is made of a transparent material, such as plastic or glass. In one embodiment, container 16 is made of acrylic. Suitable containers of this type may be obtained from Tripp Plastics of Reno, Nev. However, container 16 may also be a wire cage of a type that is used in some Keno games.

Container 16 may have many different shapes, such as a sphere, cube, cylinder or triangle, for example. In one embodiment, container 16 is substantially spherical with a partially flat back (not shown). The flat back allows container 16 to be large while still allowing gaming device 10 to be placed against a wall, another gaming device, or other objects.

Although display objects 18 are typically similar to keno balls, many other types of objects may be used. For example, display objects 18 may be ping-pong balls or rubber balls. Display 12 also comprises an agitator (not shown in FIG. 1) to agitate or jumble display objects 18 within container 16. The agitator may be a stream of air or a mechanical mixing device. The agitator causes the display objects to bounce and ricochet off of the walls of container 16. In one embodiment, a stream of air is used as an agitator and container 16 comprises an off center opening for the stream of air. The opening is off center to increase the initial agitation of display objects 18.

Fins (not shown) may also be provided at the bottom of container 16 to help agitate display objects 18. The fins support display objects 18 when they are resting at the bottom of container 16. This helps air circulate underneath display objects 18 to lift and separate the balls.

The purpose of jumbled ball display 12 is to attract and entertain players. When display objects 18 are agitated, they produce a vivid display that attracts the attention of people nearby and provides an exciting display for players playing gaming device 10. Display objects 18 are typically kept separate from prize objects used in display device 14.

Figure 1B:
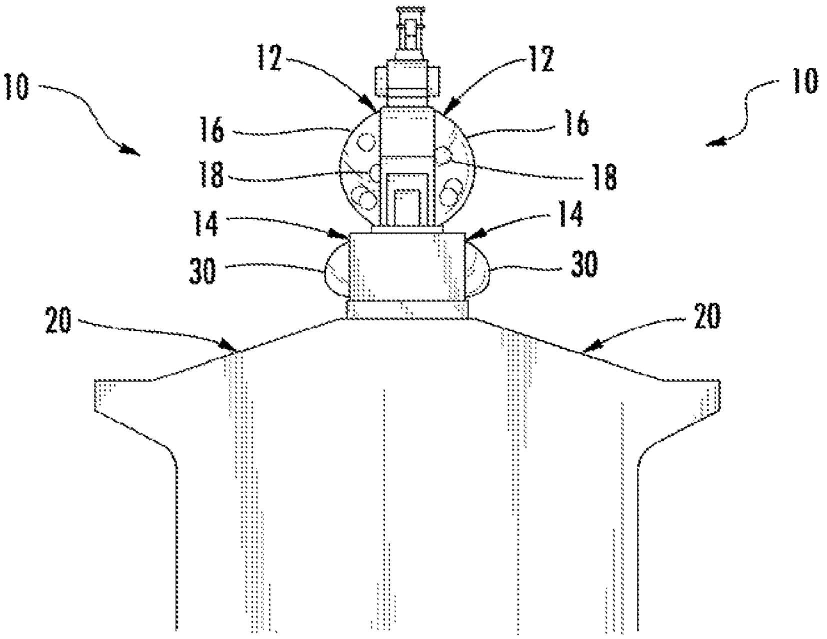
FIG. 1B is substantially a side view of an alternative embodiment of a gaming device.

FIG. 1B represents an alternative embodiment of the present invention in which two gaming devices 10 are placed back to back. Each gaming device 10 comprises a game apparatus 20. Game apparatuses 20, shown in FIG. 1B are known as "slant top" models for their sloping upper surfaces. However, other types of gaming devices, such as the upright game apparatus 20 shown in FIG. 1A, may also be used. In this embodiment, a separate jumbled ball display 12 is provided for each game apparatus 20. Each jumbled ball display 12 may comprise container 16 in the shape of a hemisphere. Containers 16 may be placed back to back so that the two containers have a spherical appearance when viewed from the side. Other shapes, such as cubes and cylinders, may also be used. A mirror may be placed at the back of each container 16 to enhance the appearance of the jumbled ball displays 12 by reflecting images of jumbled display balls 18 outward toward the players. Containers 16 may also be one single container that is divided in two by a mirror or other partition. Each container 16 has its own independently operated agitator and jumbled display balls 18. Each game apparatus 20 has its own independently operated prize display 14 with display window 30.

Referring to FIGS. 1A and 1B, prize display 14 is configured to select a prize object, in this case a ball, and display the prize object to a player. When a bonus-activating event occurs, prize display 14 senses this, selects a prize ball, and displays the ball in a display window 30.

Figure 2A:
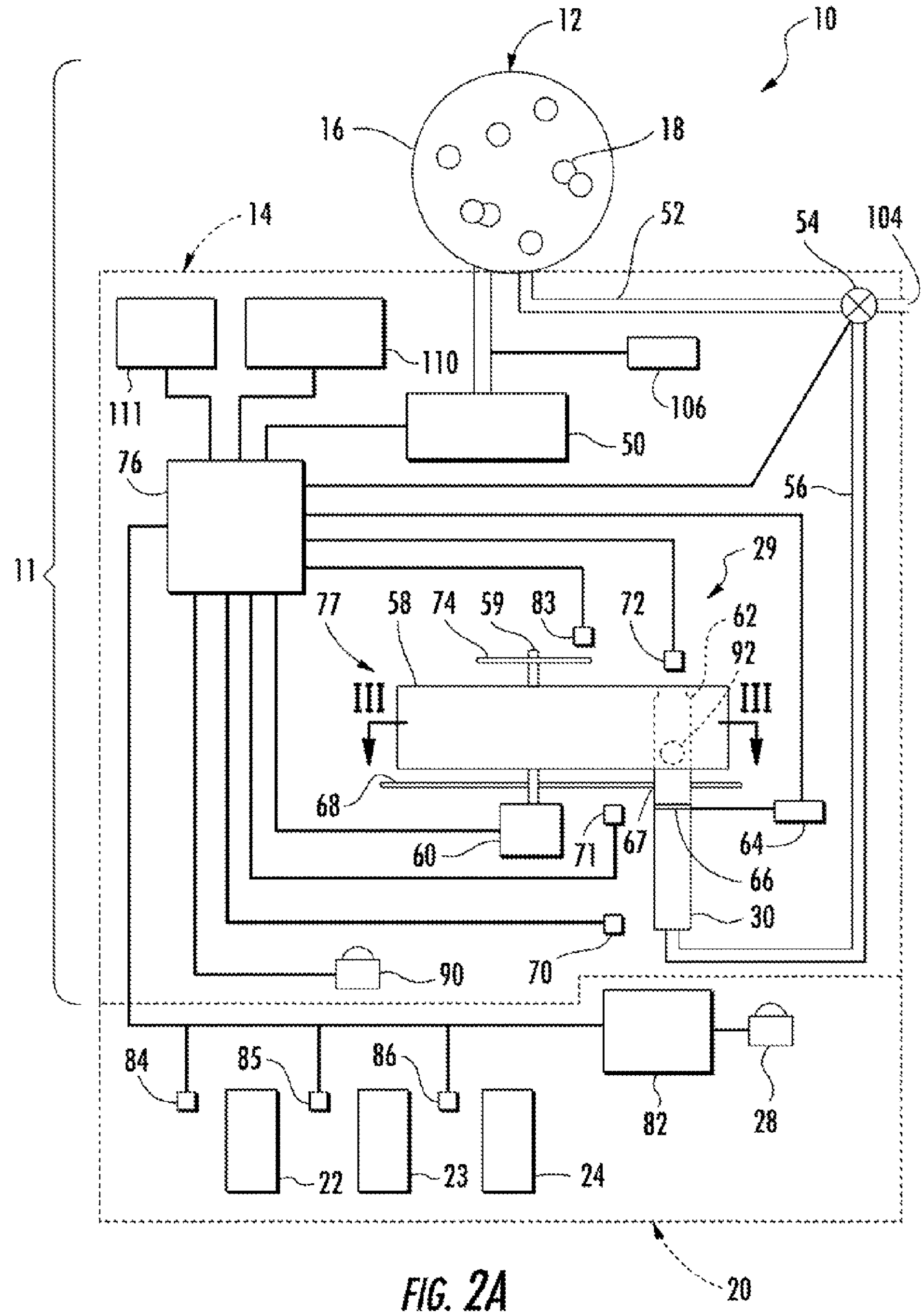
FIG. 2A is substantially a schematic diagram of a gaming device useful in the present invention.

Turning now to FIG. 2A, prize display 14 comprises a controller 76 that is configured to control the operation of the device. Controller 76 may be one or more computers or processor boards. For example, in the presently implemented embodiment, controller 76 comprises a bonus controller and stepper motor controller, which may be manufactured by Progressive Solutions in Carmichael, Calif., a core module by Z-World in Davis, Calif., and a sound board by Cleverdevices in Syosset, N.Y. Other, equally suitable devices may be purchased from other manufacturers. It is understood that controller 76 may be a single processor or processor board. Furthermore, it is also understood that controller 76 and controller 82 may be combined in a single processor or processor board.

Controller 76 is configured to detect when a bonus activating event occurs in game apparatus 20. This may be accomplished by game apparatus controller 82 transmitting a signal to controller 76 that a bonus event has occurred. For example, controller 82 may determine the outcome of each game and when a bonus-activating outcome occurs, it transmits a signal to controller 76. Alternatively, controller 76 may periodically interrogate controller 82. In another embodiment, one or more sensors may be provided for determining if a bonus activating event has occurred. For example, sensors 84-86 may sense the positions of reels 22-24. When reels 22-24 are in a bonus activating position, controller 76 would sense this position and begin a bonus sequence (described below). Sensors may also be provided external to gaming device 10 to detect external bonus-activating events.

Controller 82 may also transmit a variety of information to controller 76. For example, controller 82 may signal when coins or currency have been inserted, when a game starts, when an error has occurred, and when a sensor detects tampering.

When controller 76 detects a bonus-activating event, it may begin a bonus sequence by activating display 110. Display 110 may comprise many different kinds of display devices, such as video screens, lights and light emitting diodes (LED), for example. Display 110 may comprise its own controller that is configured to generate a variety of displays.

Display 110 may indicate that a player has qualified for a bonus round and prompt the player to perform an action. In one embodiment, the player is prompted to activate the bonus sequence by pressing input device 90. Input device 90 may be a simple button, a keyboard, or a touch screen display. In the embodiment in which the player must accumulate a number of bonus symbols to qualify for a bonus, display 110 may indicate the number of symbols the player has received.

When controller 76 detects input device 90 being activated, the controller would activate the agitator in jumbled ball display 12. In one embodiment, the agitator comprises blower 50, which blows air into container 16. Alternatively, the agitator may begin automatically and input device 90 may be used to initiate the display sequence. In another embodiment, controller 76 may wait a predetermined time period for the player to activate input device 90. If the player does not activate input device 90 in that time period, controller 76 would automatically activate the display 12 and initiate the display sequence. In yet another embodiment, controller 76 automatically initiates the display sequence in a predetermined time period, independent from input device 90, and input device 90 is only used to activate the jumbled ball display 12. It is understood that no input device may be used and controller 76 may automatically activate display 12 and begin the display sequence.

To display a prize ball, controller 76 performs a routine to determine which ball will be displayed. This may be performed by a number of methods that are well known in the art. For example, prize balls 92 may be sequentially displayed or displayed based on external events, such as certain bonus activating events may always cause the same prize ball to be displayed.

In a typical embodiment, however, prize balls 92 are randomly selected. Controller 76 generates a random number and then compares the random number to a pay table similar to that described for game apparatus 20 or as described in U.S. Pat. No. 5,823,874, issued to Adams. A simple pay table may appear as follows:

TABLE 1

| Random Number | Prize Ball Number | Amount Paid |
|---|---|---|
| 0.00 to 0.50 | 1 | $ 1.00 |
| 0.51 to 0.75 | 2 | $ 5.00 |
| 0.76 to 0.95 | 3 | ×2 |
| 0.96 to 1.00 | 4 | $1,000.00 |

For example, if the random number generator produced 0.65, prize ball number 2 would be displayed and $5.00 would be awarded to the player. If the random number generator produced 0.80, prize ball number 3 would be displayed. Prize ball number 3 is a multiplier ball that multiplies some amount produced by game apparatus 20. Gaming apparatus 20, for instance, may award $20 and the multiplier ball would multiply this by two, awarding the player $40.

This embodiment is not necessarily limited to the example pay table shown. A greater number of prize objects (balls) may be used, and, as will be discussed below, a combination of prize balls may be displayed. Furthermore, different kinds of prizes, besides monetary prizes, may be awarded. For example, the prizes may be goods, services or additional games. The goods and services may be awarded in the form of physical objects, tickets, vouchers or coupons, for example. Additional games may be presented in the form of tickets, such as scratch off lottery tickets. In the embodiments in which tickets, vouchers, and coupons are used, the objects are dispensed using an internally or externally mounted dispenser 111. Such dispensers are well known in the art.

Once controller 76 determines the prize ball to be displayed and the prize to be awarded, the controller activates a positioning mechanism 77. Positioning mechanism 77 is configured to position a selected prize object (that is separate from display objects 18) so that it can be displayed. Positioning mechanism 77 may utilize a large variety of devices to achieve its purpose. In a typical embodiment, all of the prize objects are held in a ball holder 58. Ball holder 58 may be made from a variety of materials, such as plastics, metals, or composites. In one embodiment, ball holder 58 is cast high-density urethane foam that is machined to obtain a precise shape. In one embodiment, ball holder 58 is injection molded plastic.

Prize balls 92 typically have a similar appearance to display objects 18 in container 16. This creates the illusion that prize objects displayed in display window 30 originate from display objects 18 in container 16. At least one of prize balls 92 have a symbol that is capable of indicating a prize to be awarded to the player.

Prize balls 92 are stored in ball holder 58 in an individually controlled manner so that individual balls can be selectively removed from the ball holder. This allows particular balls with particular symbols or values to be individually manipulated and displayed when desired. This may be accomplished in different ways. In one embodiment, ball holder 58 comprises a chamber 62 for each prize ball 92 stored in the holder. A display mechanism 29 is provided for removing ball 92 stored in chamber 62, displaying the ball, and replacing it in the chamber.

Figure 3:
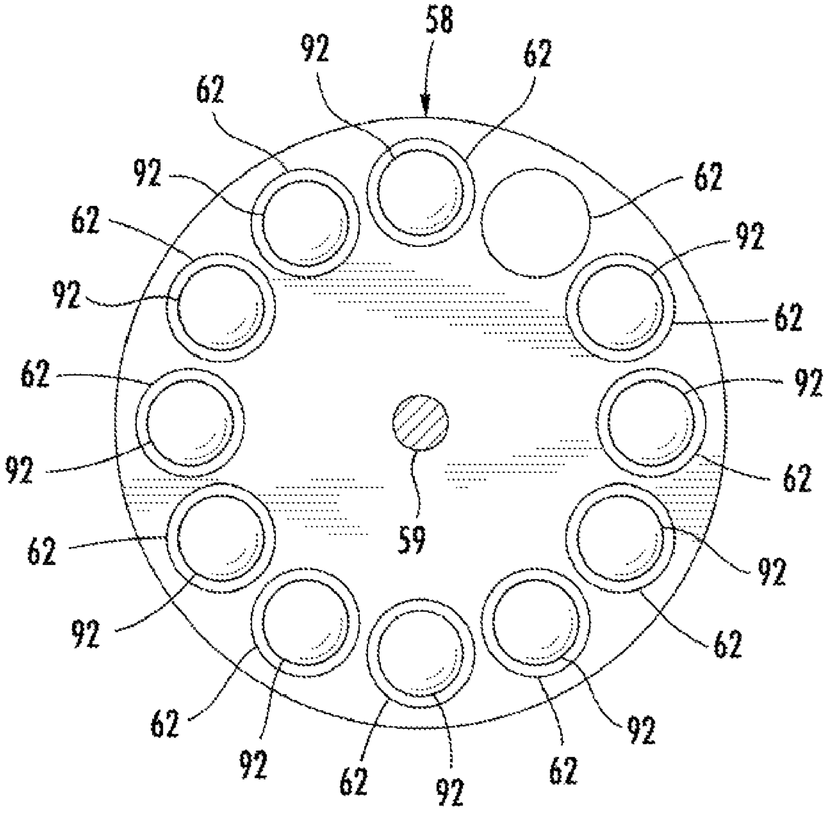
FIG. 3 is substantially a top cross sectional view of one embodiment of a prize object holder taken along line III in FIG. 2A.
Figure 4:
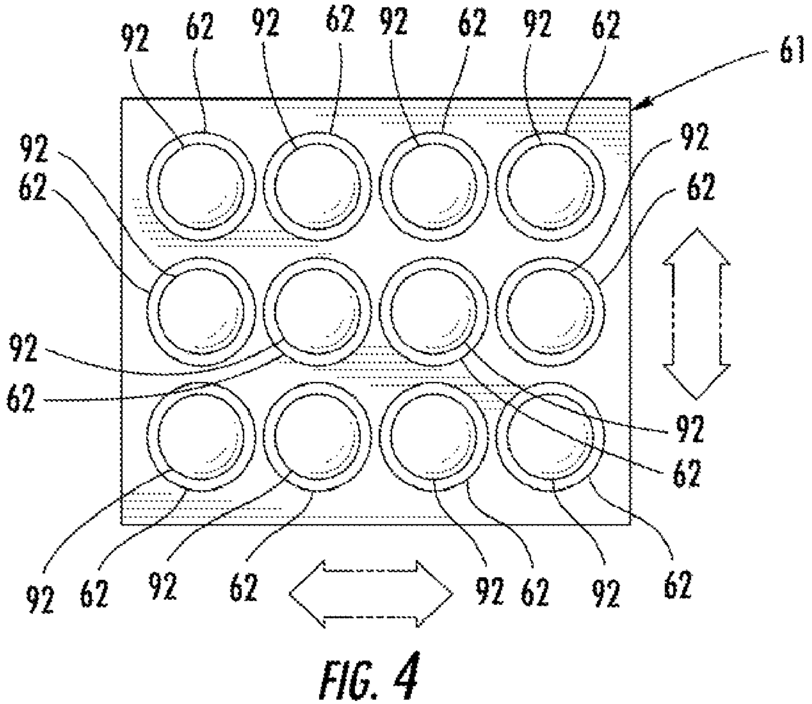
FIG. 4 is substantially a top cross sectional view of an alternative prize object holder useful in the present invention.

In one embodiment, ball holder 58 is cylindrical as illustrated in FIG. 3. Chambers 62 are positioned outward from a central axis 59 of ball holder 58, near the periphery of the holder. Thus, chambers 62 may be positioned by rotating ball holder 58 around its central axis 59. Ball holder 58 may be provided in different configurations. For example, as shown in FIG. 4, ball holder 61 may be square or rectangular with chambers 62 arranged in rows and columns. In this embodiment, controller 76 is programmed with the location of chambers 62 and ball holder 61 is positioned by moving it laterally and longitudinally. Stepper motors and gears may perform the lateral and longitudinal positioning (not shown).

Returning to FIG. 2A, positioning mechanism 77 comprises a stepper motor 60 for rotating holder 58. Wheel 74, rigidly attached to holder 58, and sensor 83, not attached to the holder, are provided for determining the angular position of the holder. Thus, controller 76 can position a ball 92 in holder 58 where it can be removed and replaced by rotating the holder and monitoring its angular position. The angular position of each prize ball 92 is stored in memory in controller 76. Sensor 83 may be an infrared source and detector and the periphery of wheel 74 may comprise portions with different reflective characteristics, such as physical holes or gaps or absorbent paint lines. Alternatively, an optical flag configuration similar to that described in U.S. Pat. No. 4,911,449, issued to Bertram, may be used.

Figure 5A:
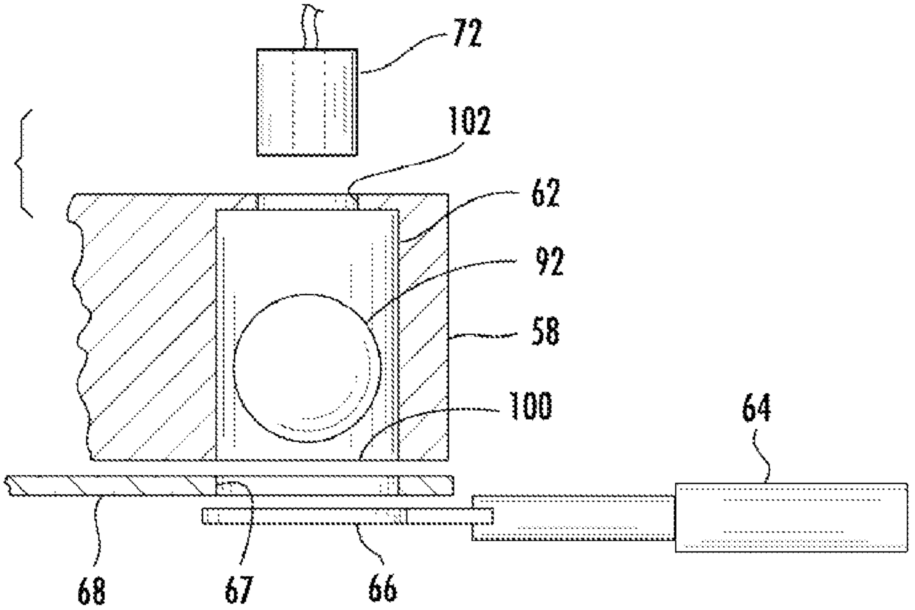
FIG. 5A is substantially an enlarged view of the prize object holder shown in FIG. 2A.

In one embodiment, holder 58 is arranged to allow the force of gravity to remove balls 92 from the holder. Referring now to FIGS. 2A and 5A, each chamber 62 has a lower opening 100 that is large enough for prize ball 92 to pass through. A plate 68 is provided on the lower surface of holder 58 for preventing prize balls 92 from falling out of chambers 62. A hole 67 is provided in one portion of plate 68 for allowing ball 92 to pass through the plate. A gate 66 blocks ball 92 until it is opened by an actuator 64. Gate 66 may cover the entire hole 67 or just a portion of it and it may be operated in a sliding or hinged manner. Actuator 64 may be an electrical solenoid actuator.

Figure 5B:
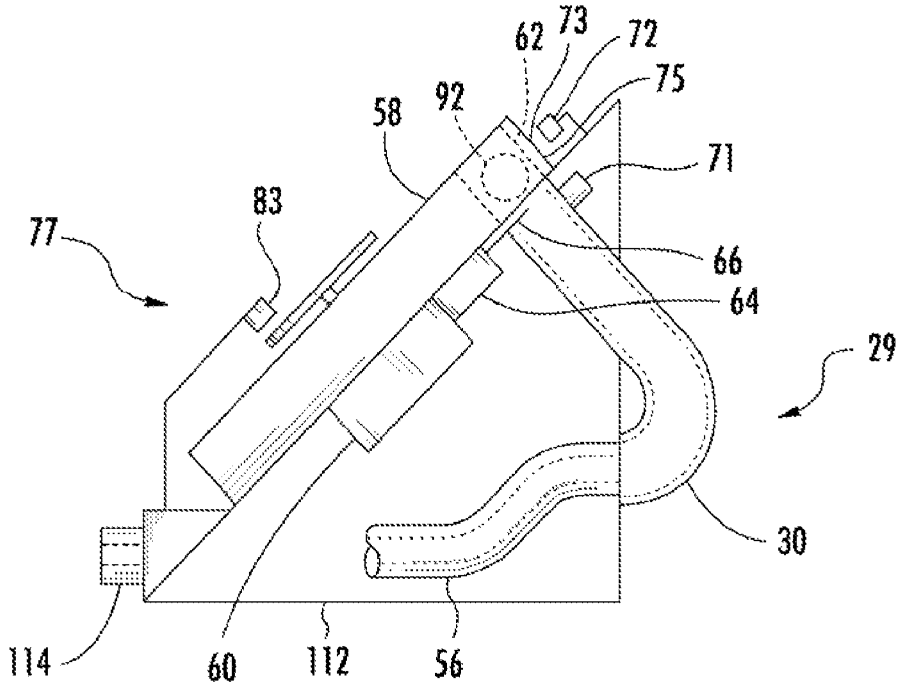
FIG. 5B is substantially a side elevational view of positioning and display mechanisms useful in the present invention.

FIG. 5B represents one embodiment in which a chassis 112 supports ball holder 58 at approximately a forty-five degree angle to the vertical. Mounting grooves (not shown) may be provided in prize display 14 for slidably receiving chassis 112 and connector 114 may be provided for connecting electrical circuits and devices to power supplies and controller 76. One of the advantages of this embodiment is that positioning mechanism 77 and display mechanism 29 can be easily serviced by removing chassis 112 from prize display device 14.

Referring to FIGS. 2A and 5A, in normal operation, after controller 76 has determined which prize ball is to be displayed, the controller rotates holder 58 until the desired prize ball 92 is positioned over the plate hole 67. At the appropriate time, controller 76 activates actuator 64 to open gate 66. The force of gravity then pulls prize ball 92 downward through hole 67 into display window 30. Display window 30 may be a chamber with a transparent or partially transparent wall that allows the player to see selected prize ball 92. In one embodiment, display window 30 comprises a tube that projects outward from the front surface of prize display device 14. This allows players to view prize ball 92 from many different angles and see symbols on the ball. Sensors 70 and/or 71 may be used to verify that prize ball 92 has fallen into display window 30. If sensors 70 and/or 71 do not detect ball 92 in its proper position, controller 76 may enter an error mode.

If the prize ball is detected in its proper position, controller 76 may cause display 110 to display the prize, if any, that the player has won. Other effects may also be presented, such as pre-recorded sound from speakers. If the actual prize is money, the amount of the prize may be added to the player's credit meter or the prize may be dispensed from dispenser 111 or coin dispenser 27.

After ball 92 has been displayed long enough, controller 76 operates a valve 54 to divert exhaust air from container 16. While blower 50 is in operation, air is allowed to escape container 16 through an exhaust duct 52. Valve 54 is used to divert air from a vent 104 to a display duct 56. Display duct 56 directs air to the bottom of display window 30 where it blows the ball 92 upwards back into chamber 62. An upper opening 102 is provided in chamber 62 for allowing air to escape from the chamber thereby producing an air current. Sensors 72 and/or 71 may be used to verify that ball 92 has returned to chamber 62. If the ball is not detected in its proper position, controller 76 may enter an error mode and an attendant is called. In one embodiment, shown in FIG. 5B, sensor 72 is placed next to the peripheral wall 75 of ball holder 58 and a hole 73 is provided in the peripheral wall next to each chamber 62.

Components may be arranged alternatively so that prize object display window 30 is located above holder 58 and ball 92 is blown upwards into the display. When valve 54 is closed, the force of gravity pulls ball 92 back into chamber 62. In this alternate embodiment, once ball 92 has returned to chamber 62, controller 76 closes gate 66 by activating actuator 64, turns off blower 50, and waits for the next activating event.

A power failure or power surge could cause actuator 64 to malfunction and improperly open gate 66 while prize display 14 is idle. This would cause prize ball 92 to fall out of chamber 62 into display window 30, thereby giving a false indication that the player had won a prize. In order to prevent this, in one embodiment, at least one chamber 62 does not have prize ball 92 (see FIG. 3). This empty chamber is positioned over hole 67 whenever prize display 14 is idle.

It is understood that other methods for agitating display objects 18 may be provided. For example, a variety of agitator means may be employed, such as those comprising display object transport devices configured to move the plurality of display objects from a first (one) area of the container to a second (another) area of the container (see subsequent discussion on display object transport devices). In one embodiment, activation of any of the various display object transport devices moves the display objects from one area to another area of the container and may provide an appearance of continuous motion of the plurality of display objects in the container. In addition, other methods for actuating and displaying prize objects 92 may be used. The present invention is not limited to any particular method or apparatus for agitating or displaying display objects 18 and/or prize objects 92.

For example, in certain embodiments, including embodiments discussed further below, display balls 18 may be agitated by actuation of jumbled ball display 12. If display balls 18 are agitated by actuation of jumbled ball display 12, it may be desirable to employ other methods of actuating and displaying prize balls 92. For example, if an air compressor is not needed for agitation of display balls 18, it may be beneficial to modify the method of displaying prize balls 92 so that the air compressor may be eliminated from game apparatus 20.

Figure 2B:
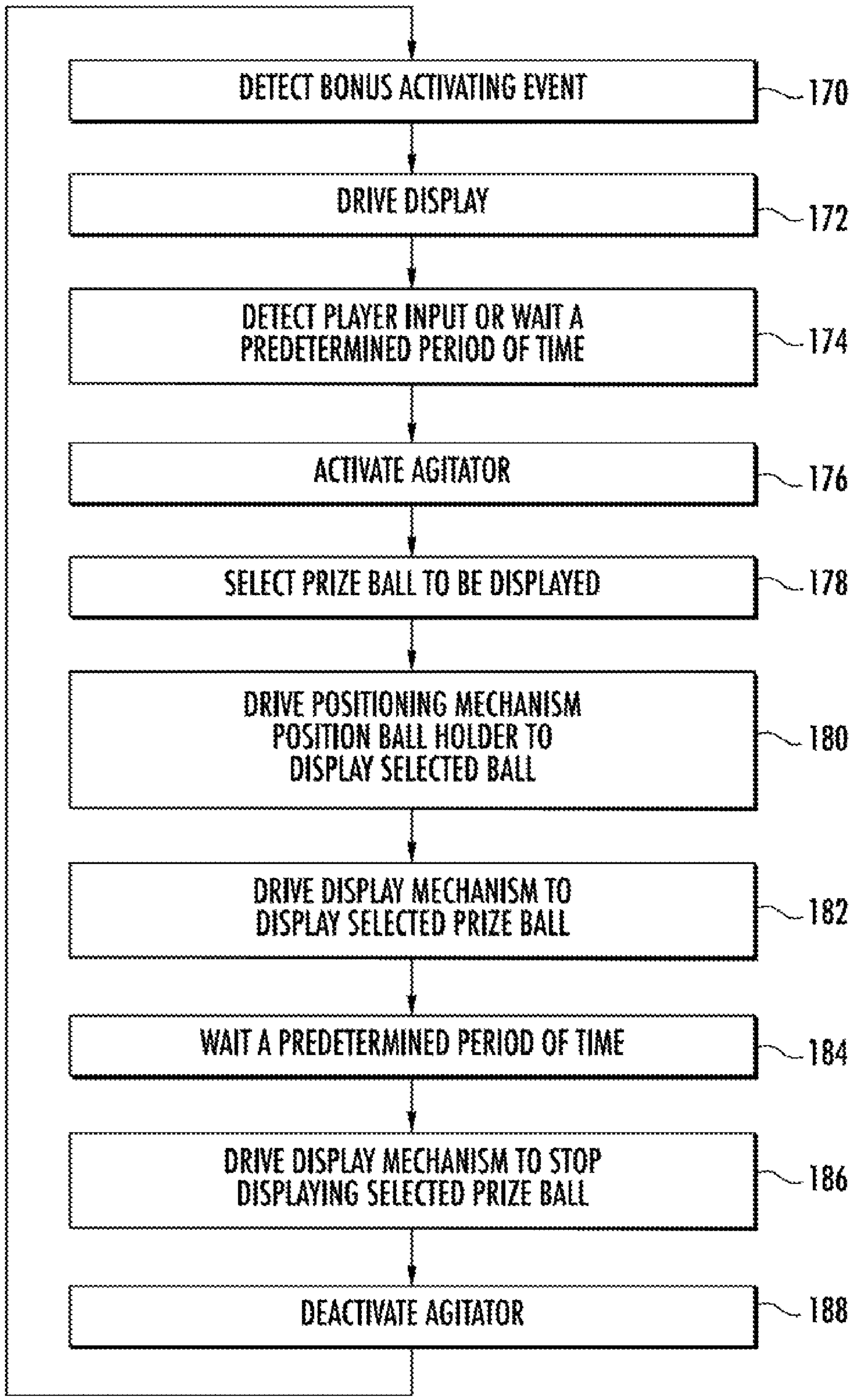
FIG. 2B is substantially a flow chart showing one of the many ways the display device may be operated.
Figure 2C:
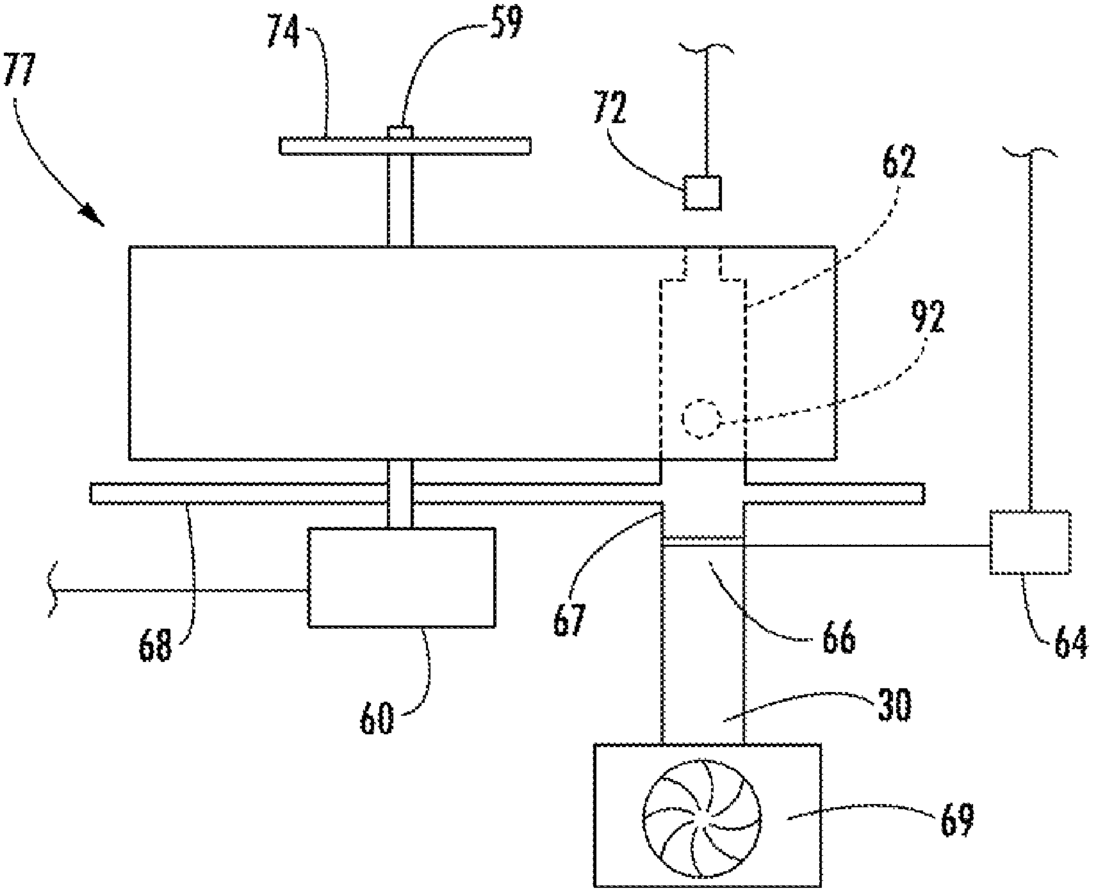
FIG. 2C is substantially a schematic diagram of one embodiment of a prize object display mechanism for use in the gaming device of FIG. 2A.

For example, as illustrated in FIG. 2C, rather than opening valve 54 to divert air to display duct 56 (as in FIG. 2A), an air source or blower can be located below display window 30. For example, a fan 69 may be placed below display window 30. When activated by controller 76, fan 69 operates and creates a stream of air that blows display ball 92 in display window 30 back into chamber 62. Although many fans can be used, one suitable fan is direct current (d.c.) brushless fan motor model number BG0703-B044-000 available from Minebea Co., Ltd. of Tokyo, Japan. It is understood that other air sources besides fans may be used without departing from the scope of the present invention.

Because some balls are very light, static electricity can cause the balls to stick to each other and to other components. To prevent this, a variety of static discharge devices 106 may be placed in various locations in the present invention. In one embodiment, static discharge device 106 (FIG. 2A) is a bare stranded copper wire with its strands spread out. The wire is placed in the flow of air between agitator 50 and container 16 and wire is attached to a common ground.

Prize display 14 may also comprise means for simultaneously displaying a plurality of balls 92. To accomplish this, plate 68 may have multiple holes 67 (not shown), each with its own gate 66 and actuator 64, for supplying balls to multiple display windows. Thus, holder 58 may be positioned so that the appropriate ball is positioned over the appropriate hole 67 for supplying the appropriate display window 30. Alternatively, a plurality of ball holders 58 may be provided, each one supplying balls to a separate display window 30.

Figure 6:
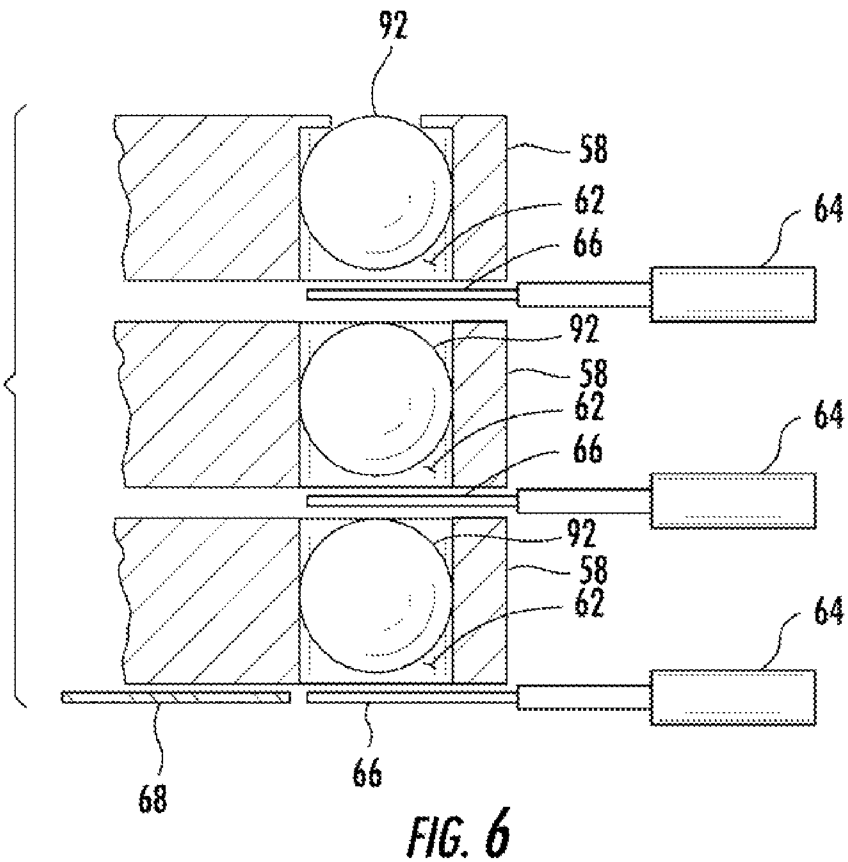
FIG. 6 is substantially a schematic diagram of an alternative embodiment using multiple stacked prize object holders.

In yet another embodiment, seen in FIG. 6, a plurality of separately controlled ball holders 58 are arranged in a stack. Each ball holder 58 is rotated to a position so that chambers 62 are aligned above display window 30 (FIG. 1A). Gates 66 are then opened and balls 92 are allowed to fall into display window 30. In this embodiment, display window 30 is large enough to display three balls simultaneously. When the display period has ended, balls 92 are blown back into chambers 62 and gates 66 are closed to separate and contain the balls. The action of gates 66 separates prize balls 92 into separate chambers 62.

With multiple prize objects being displayed, it is possible to use combinations of prize objects to indicate various bonus outcomes. It is also possible to replace the primary display of a gaming device with selector and prize display device 14. In other words, game apparatus 20 may be entirely replaced with selector and prize display device 14.

Figure 7:
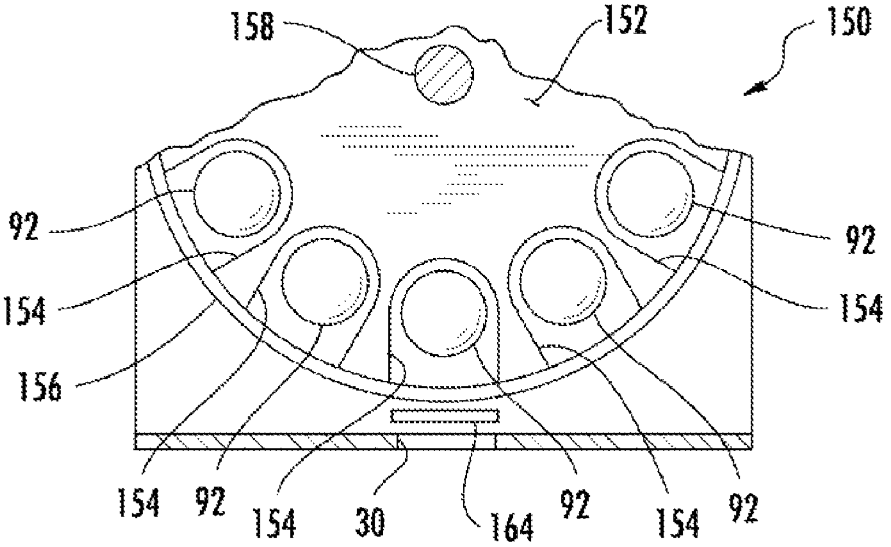
FIG. 7 is substantially an alternative display mechanism useful in the present invention.

An alternative display mechanism 150 is shown in FIG. 7. Display mechanism 150 comprises a cylindrical prize object holder 152 that may be rotated around its central axis 158. Ball holder 152 comprises a plurality of chambers 154 positioned along the periphery of the holder, each chamber is configured to hold ball 92. Unlike the embodiment described in FIG. 2A, it is not necessary to remove and replace balls 92 from chambers 154. Instead, at least a portion of the outer wall of each chamber 154 comprises a transparent material that allows players to view balls 92 inside the chamber. The transparent wall may comprise a ring of transparent material 156 that surrounds holder 152. A shutter device or door 164 may be provided between display window 30 and holder 152 for blocking the view of players while the holder is rotated. Although this embodiment has the advantage of a simpler mechanism, it may be less entertaining to players because it may be more apparent to the players that balls 92 do not originate from jumbled ball display 12.

Figure 1C:
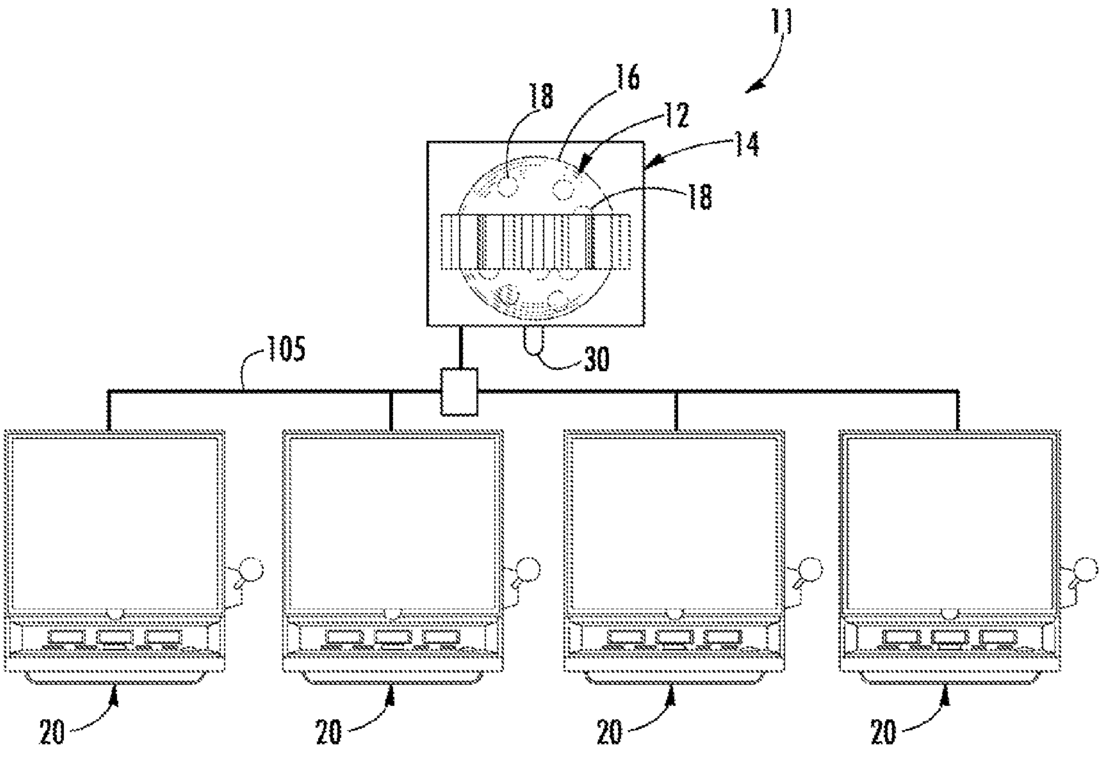
FIG. 1C is substantially a top schematic diagram of a display device useful in the present invention in use with a plurality of game apparatus.

As seen in FIG. 1C, a single display device 11 may also be used with a plurality of game apparatus 20. In this embodiment, each game apparatus is in communication with display device 11 by a communication device 105. Communication device 105 may be a network cable, such as an Ethernet cable, and appropriate hardware, such as network interface cards, may be included in display device 11 and game apparatus 20. When one of the game apparatus 20 produces a bonus-activating event, a signal is sent to display device 11. A prize ball may then be selected and displayed as described above.

Turning now to FIG. 2B, one embodiment for operation of prize display 14 begins with controller 76 detecting a bonus-activating event 170. Controller 76 may then drive display 110 (shown in FIG. 1A) to display an appropriate presentation or message 172. As discussed above, controller 76 may wait for player input from input device 90 (shown in FIG. 2A) or it may wait for a predetermined period of time 174. At some point, controller 76 activates the agitator 176 and selects a prize ball to be displayed 178 from ball holder 58. Controller 76 then drives positioning mechanism 77 to position ball holder 58 so that the selected prize ball may be displayed 180 and causes display mechanism 29 to display the selected ball 182. Controller 76 may then wait a predetermined period of time so that the player may see the displayed prize ball 184, after which it causes display mechanism 29 to stop displaying the selected prize ball 186. The agitator is then deactivated 188 and controller 76 returns to a monitoring state to detect the next bonus activating event 170.

Figure 8:
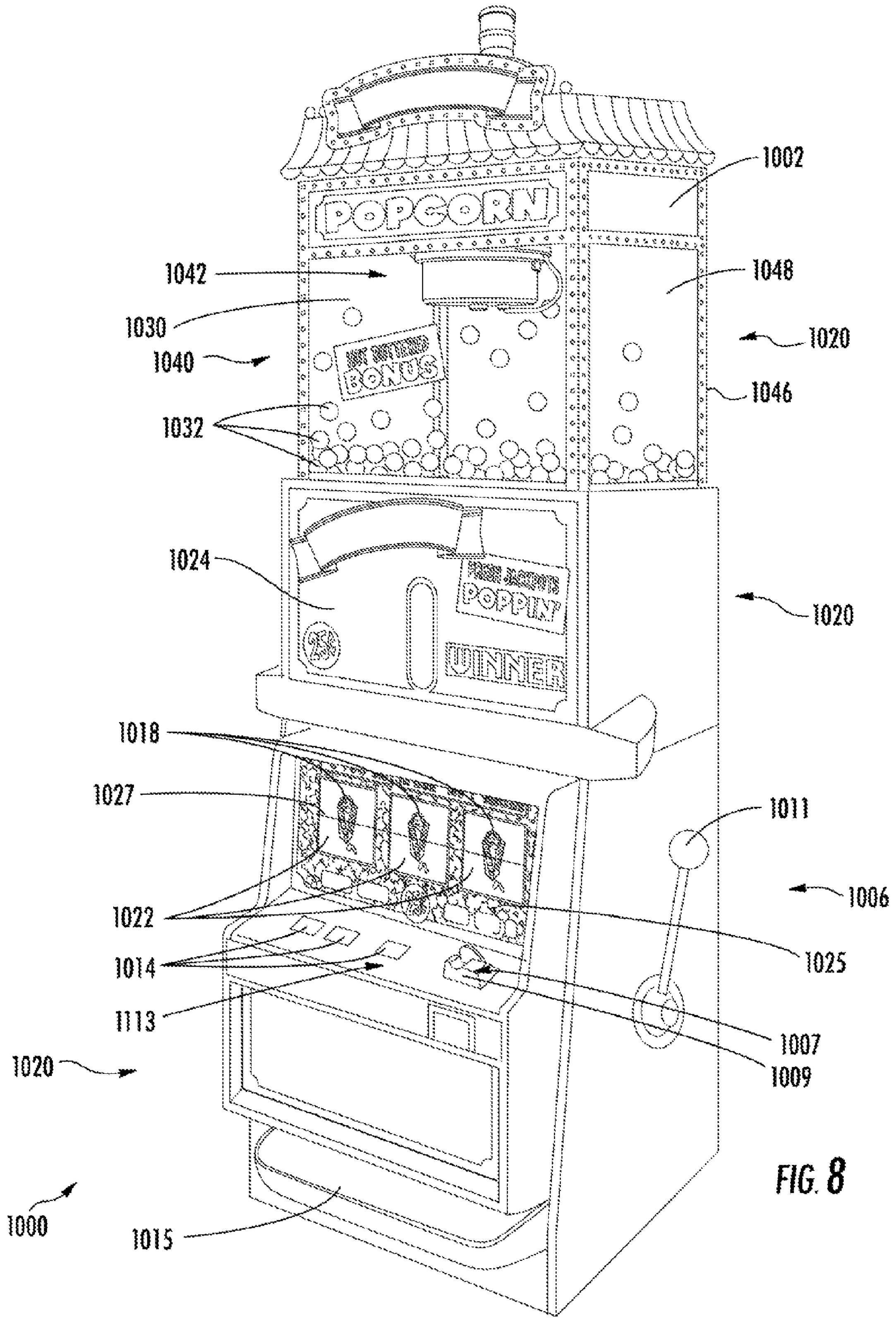
FIG. 8 is a front perspective view of another embodiment of a gaming device useful in the present invention.

FIG. 8 shows another embodiment involving a gaming device 1000 having a jumbled ball display 1002 provided with a transport device 1004 (not shown in FIG. 8, but illustrated in FIGS. 9-15D) useful in the present invention. Notably, gaming devices 1000 may be any of a large number of devices that are configured to allow players (not shown) to play a game, such as those typically found in arcade and casino environments, including arcade games, video games, gambling machines, video poker machines, and slot machines, for example. In this embodiment, the gaming device 1000 represents a slot machine 1006, which may have a value acceptor 1007 for accepting value from a player, such as a coin slot 1009, card reader (not shown), or a voucher reader (not shown). A handle 1011 and/or a button(s) 1014 also may be provided for activating the gaming device 1000 to begin a game.

A payout mechanism (not shown) and a coin dispenser 1015 may be provided for awarding prizes or for dispensing value to players cashing out and retiring from a game. A printer (not shown) may also be provided for printing out cashless vouchers. A pay table (not shown) may further be provided to allow a player to see what symbol 1018 or combination of symbols provide one or more winning events.

As further shown in FIG. 8, the gaming device 1000 includes one or more display devices 1020 which may include physical game reels 1022, a bonus display 1024, and/or a video display device (not shown) including a cathode ray tube, LCD (liquid crystal display), LED, plasma, for example, configured to display at least one symbol 1018 from a plurality of symbols 1018, which may include, for example, any letter, word, number, picture or image. In this figure, the symbols 1018 generally are represented by "a popcorn box with popcorn." The physical game reels 1022 may be attached to a drive mechanism (not shown) to rotate the reels 1022 in a manner well known in the art.

A panel 1025 may cover the game reels 1022 such that only a portion of their individual circumferences is shown to the player. At least one symbol 1018 from any of the game reels 1022 may be used to display a game outcome and/or activate a base game or bonus game cycle (see FIGS. 2B and 21). At least one pay line 1027 may be provided for the player to use in determining a game outcome based on the symbol 1018 or combination of symbols 1018 positioned thereon.

As indicated above, the display device 1020 also may include a video display (not shown) displaying game symbols 1018, for example, letters, words, numbers, pictures or images, in any number of formats and arrangements. Alternatively, the video display (not shown) may display images of game reels 1022 having symbols 1018 and an image of at least one pay line 1027. It is understood that the gaming device 1000 may comprise more than one display device 1020 such that the gaming device 1000 could include physical game reels 1022, a bonus display 1024, a jumbled ball display 1002, and/or a video display (not shown), or any combination thereof. Accordingly, the display device 1020, such as the jumbled ball display 1002, may be positioned at the top of the gaming device 1000, separate from the gaming device 1000 but in communication therewith, or in communication with a plurality of different gaming devices 1000 via a computer network in a manner that is well known in the art.

FIG. 8 shows the jumbled ball display 1002 and bonus display 1024, which typically are configured to cooperate with the gaming device 1000 during a base game or bonus game. One acceptable type of jumbled ball display 1002 is described in U.S. Pat. No. 6,338,678, issued on Jan. 15, 2002, incorporated herein by reference. Notably, the jumbled ball display 1002 in FIG. 8 includes a container 1030 that is configured to hold at least one, typically a plurality, of display objects 1032 including any type of ball, for example, keno balls, ping-pong balls and rubber balls.

A prize object (ball) holder (not shown in FIG. 8, but similar to that discussed regarding FIGS. 2A, 3 and 4, for example) may be used in conjunction with the jumbled ball display 1002 and is further described in U.S. Pat. No. 6,338,678. More specifically, the ball holder (not shown) may be contained within the bonus display 1024 to display one or more prize objects, including any type of ball, for example, keno balls, ping-pong balls or rubber balls, associated with a base game or bonus game cycle.

The container 1030 may be at least partially transparent allowing players to view one or more of the display objects 1032 inside of the container. The container 1030 may be made of acrylic or other materials, including, for example, plastic, glass, or wire mesh. One or more display objects 1032 may have colors and/or symbols, for example, letters, words, numbers, pictures or images.

Figure 9:
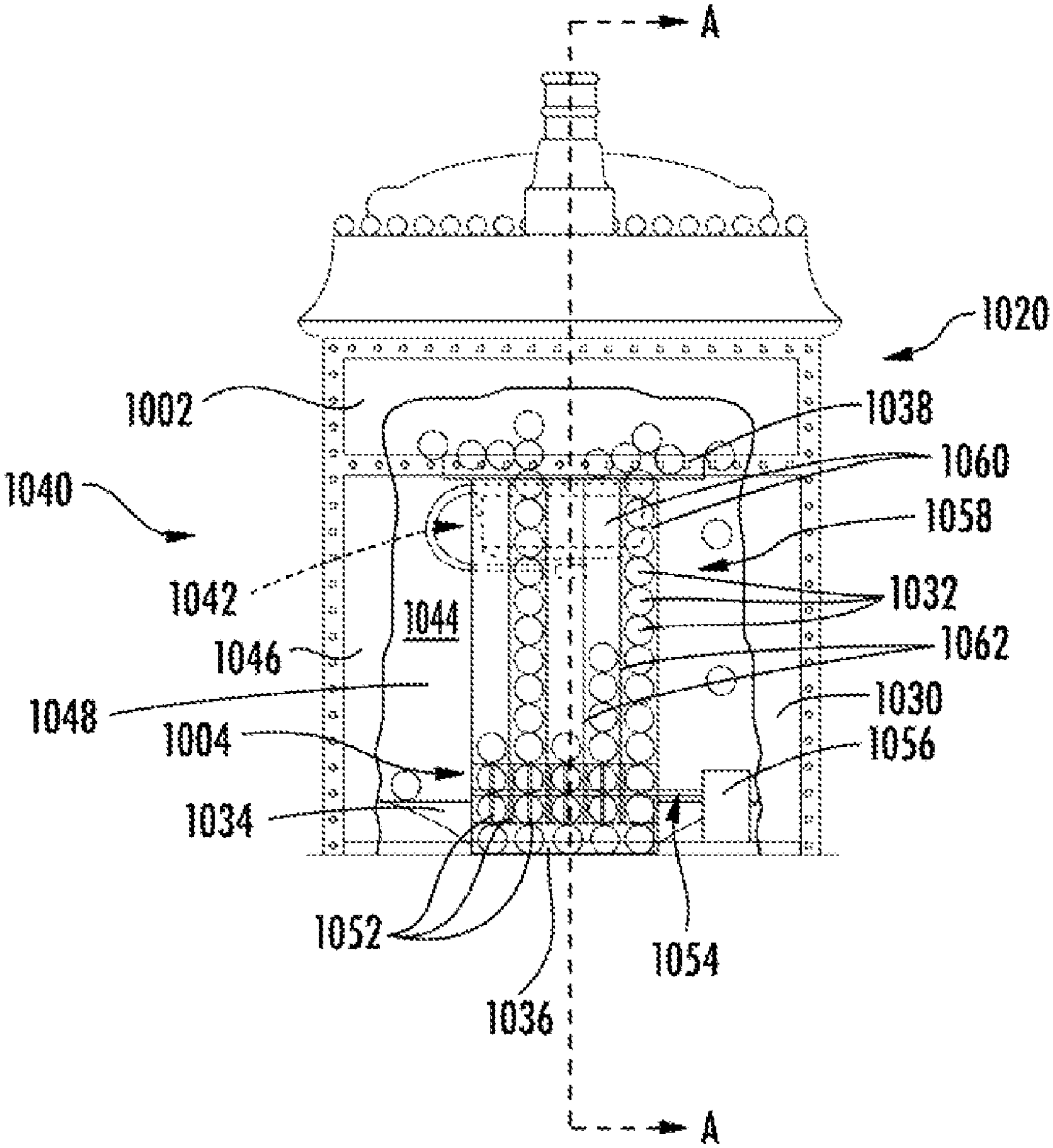
FIG. 9 is a partially cut-away rear elevational view of the jumbled ball display of FIG. 8 showing a transport device.
Figure 10:
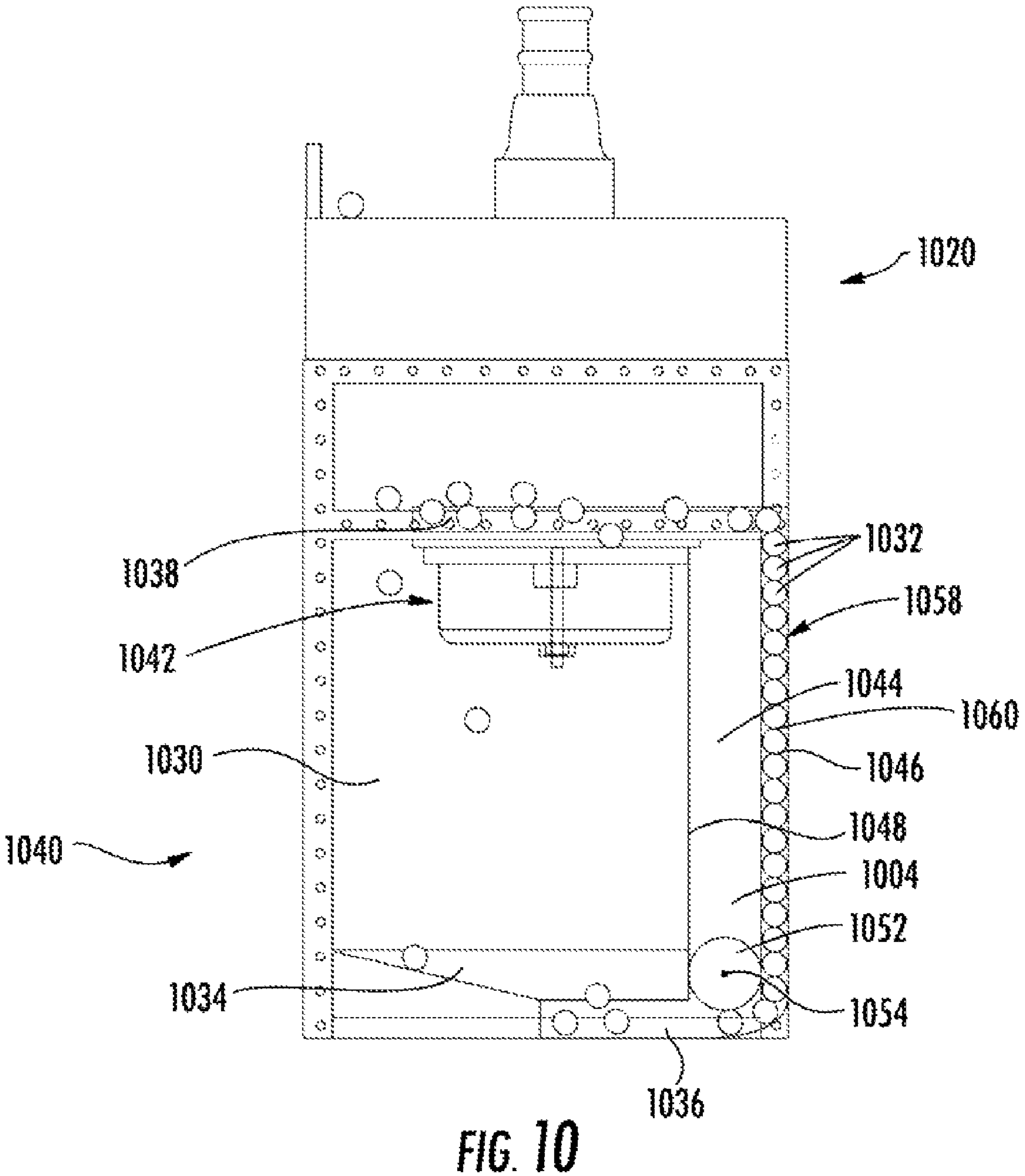
FIG. 10 is a cross-sectional view of FIG. 9 taken along line A-A

As best shown in FIGS. 9 and 10, the container 1030 further includes a floor 1034 having a receptacle 1036 configured to collect the display objects 1032. The floor 1034 typically is sloped downwardly toward the receptacle 1036 so that the display objects 1032 move effortlessly theretoward. A platform 1038 typically is located suspended substantially within the top half of the container 1030 for receiving one or more display objects 1032 from the at least one transport device 1004. In FIGS. 8-14, the container is shown simulating a popcorn popper 1040, such as an old fashioned kettle corn popper. The platform 1038 typically is disguised by a kettle 1042.

Display Object Transport Devices

The container 1030 further includes a rear compartment 1044 substantially defined by a back wall 1046 and a spaced-apart false wall 1048. The compartment 1044 allows for the placement of transport device 1004 therein with the false wall 1048, typically keeping the transport device 1004 out of view from a player. Suitable transport devices 1004 may include, for example, conveyor belts, discs, wheels, lifts, claws and augers. The transport device 1004 may further include at least one transport component 1050 (see FIGS. 13-15C) such as, for example, cups, bowls, scoops, buckets, ledges, shovels and blades, cooperating with the transport device 1004 and configured to receive the at least one display object 1032, for example, a ball, from the receptacle 1036. In one embodiment, the transport component is a helical blade.

As further shown in FIGS. 9 and 10, the transport device 1004 includes a plurality of vertically oriented discs 1052 rotatably secured to an axle 1054 that cooperates with a motor 1056. The discs 1052 may comprise, for example, plastic or rubber. When the motor 1056 is activated, the discs 1052 rotate about the axis of the axle 1054. The discs 1052 typically are located substantially within the receptacle 1036 such that the discs 1052 are spaced apart therefrom so that a display object 1032 can be received therebetween. Accordingly, one or more display objects 1032 in the receptacle 1036 come into contact with the rotating discs 1052, and are moved up to the platform 1038 by way of a chute 1058, which may include one or more channels 1060 separated by dividers 1062. The channels 1060 typically are slightly wider than the display objects 1032 and help guide the objects 1032 to the platform 1038. Notably, the rotating discs 1052 continuously fill the channels 1060 with the display objects 1032 thereby forcing the display objects 1032 up to the platform 1038. The display objects 1032 eventually are received onto the platform 1038 only to free fall therefrom back to the floor 1034 thereby typically providing the illusion of popcorn popping and falling from the kettle 1042.

In an alternative embodiment, as shown in FIGS. 15E and 15F, a cylinder 1064 may replace the circular discs 1052. The cylinder 1064 similarly is disposed about an axle 1066 for movement thereabout and may include, for example, plastic or rubber. The cylinder 1064 can be activated by a motor 1056 and typically includes an accordion-like surface 1068 for cooperating with the at least one display objects 1032. In another alternative embodiment (not shown), a cylinder may comprise ridges in the form of a continuous ribbed surface, where the ribs or ridges are aligned circumferentially along the surface of the cylinder, that is, orthogonal to the axle of the cylinder; as the cylinder rotates about the axle, display objects caught in the ridges or ribs are thereby transported on the surface of the cylinder along the axis of the cylinder. This embodiment is in contrast to cylinder 1064 (FIG. 15F) where the strips of the accordion surface are arranged parallel to the axle, rather than being arranged at right angles to the axle.

Figure 11:
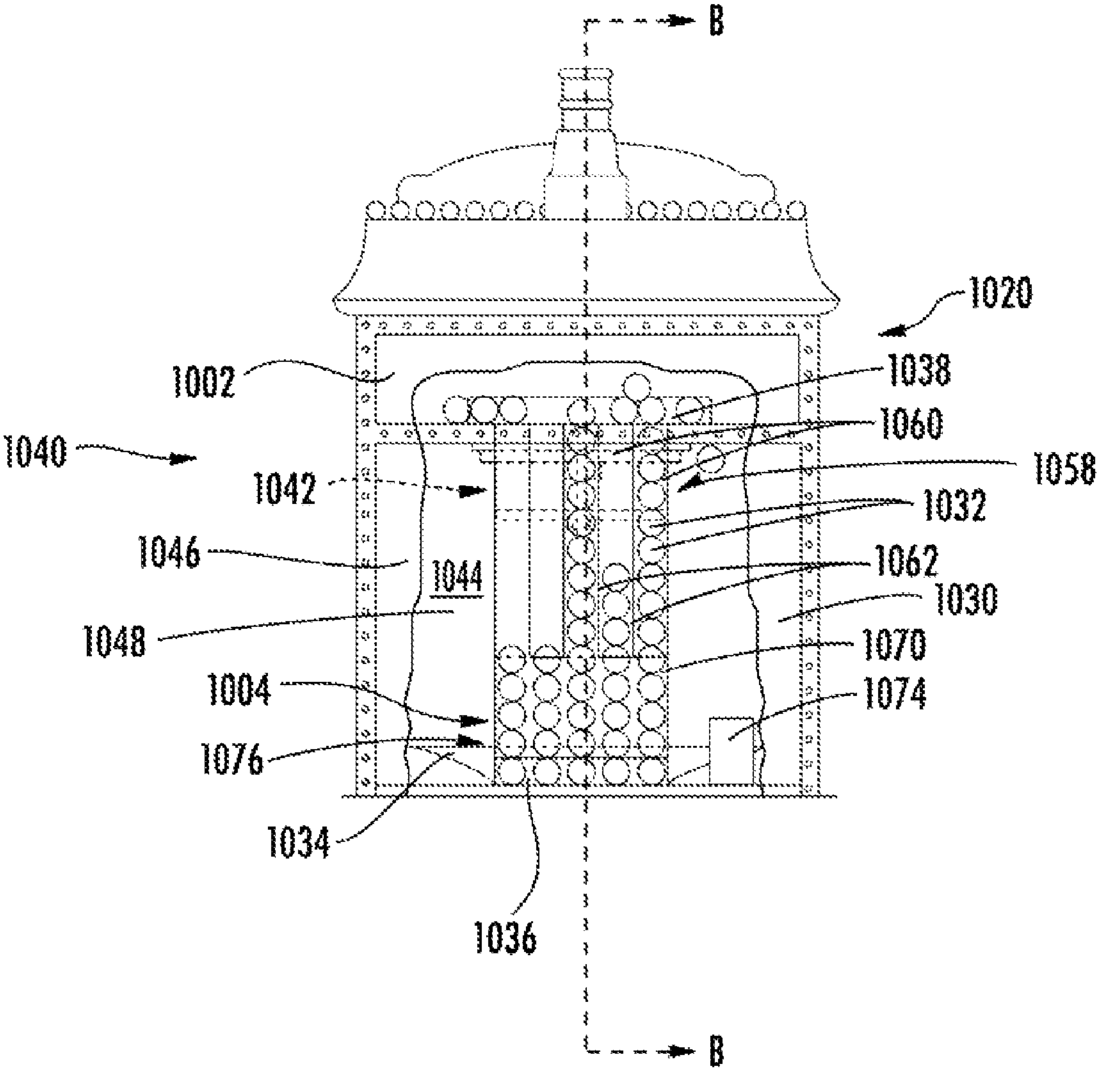
FIG. 11 is a partially cut-away rear elevational view of the jumbled ball display of FIG. 8 showing another embodiment of a transport device.
Figure 12:
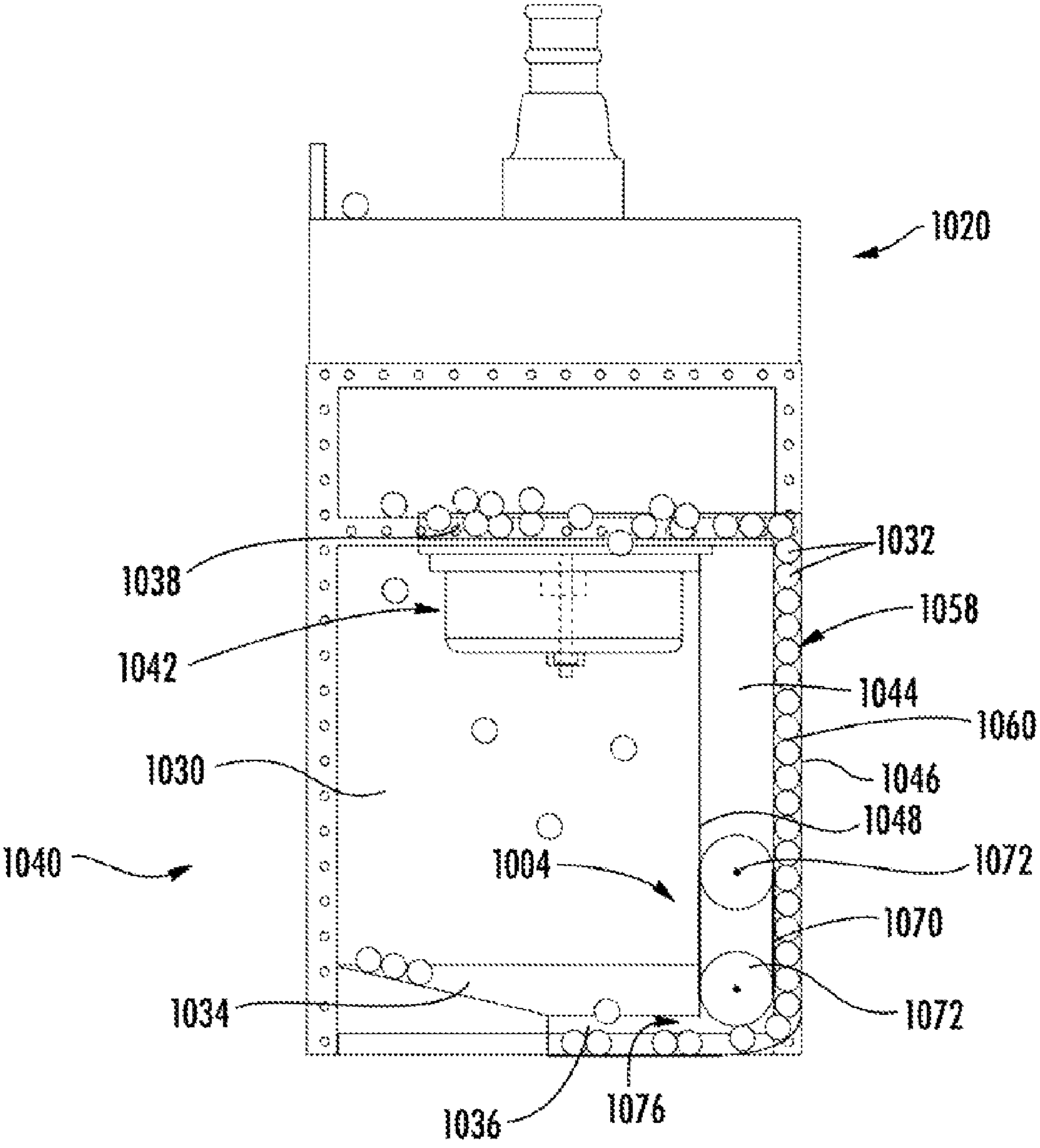
FIG. 12 is a cross-sectional view of FIG. 11 taken along line B-B.

FIGS. 11 and 12 show another embodiment of the transport device 1004 useful in the present invention including at least one conveyor belt 1070 substantially vertically oriented and cooperating with at least one roller 1072 to rotate therearound when at least one roller 1072 is activated by a motor 1074. The conveyor belt 1070 can be any conventional type known in the art and may include, for example, wire mesh, rubber or plastic. It is understood that a plurality of conveyor belts 1070 may be placed in a side-by-side arrangement in place of one conveyor belt 1070.

When the motor 1074 is activated, conveyor 1070 belt rotates around the rollers 1072. Typically, at least one end 1076 of the conveyor belt 1070 is substantially located within the receptacle 1036 with the one end 1076 being spaced apart therefrom so that the display objects 1032 can be received therebetween, typically wedged therebetween.

Accordingly, one or more display objects 1032 in the receptacle 1036 come into contact with the conveyor belt 1070, and are moved from the receptacle 1036, typically via friction, up to the platform 1038 by way of the chute 1058, which includes the one or more channels 1060 separated by dividers 1062. The channels 1060 typically are slightly wider than the display objects 1032 and help guide the objects 1032 to the platform 1038. Notably, the conveyor belt 1070 continuously fills the channels 1060 with the display objects 1032 thereby forcing the display objects 1032 up to the platform 1038. The display objects 1032 eventually are received onto the platform 1038 only to free fall therefrom back to the floor 1034 thereby providing the illusion of popcorn popping and falling from the kettle 1042. It is understood that the conveyor belt 1070 could extend substantially the length of the container 1030 to transport the display objects 1032 directly to the platform 1038.

Figure 13:
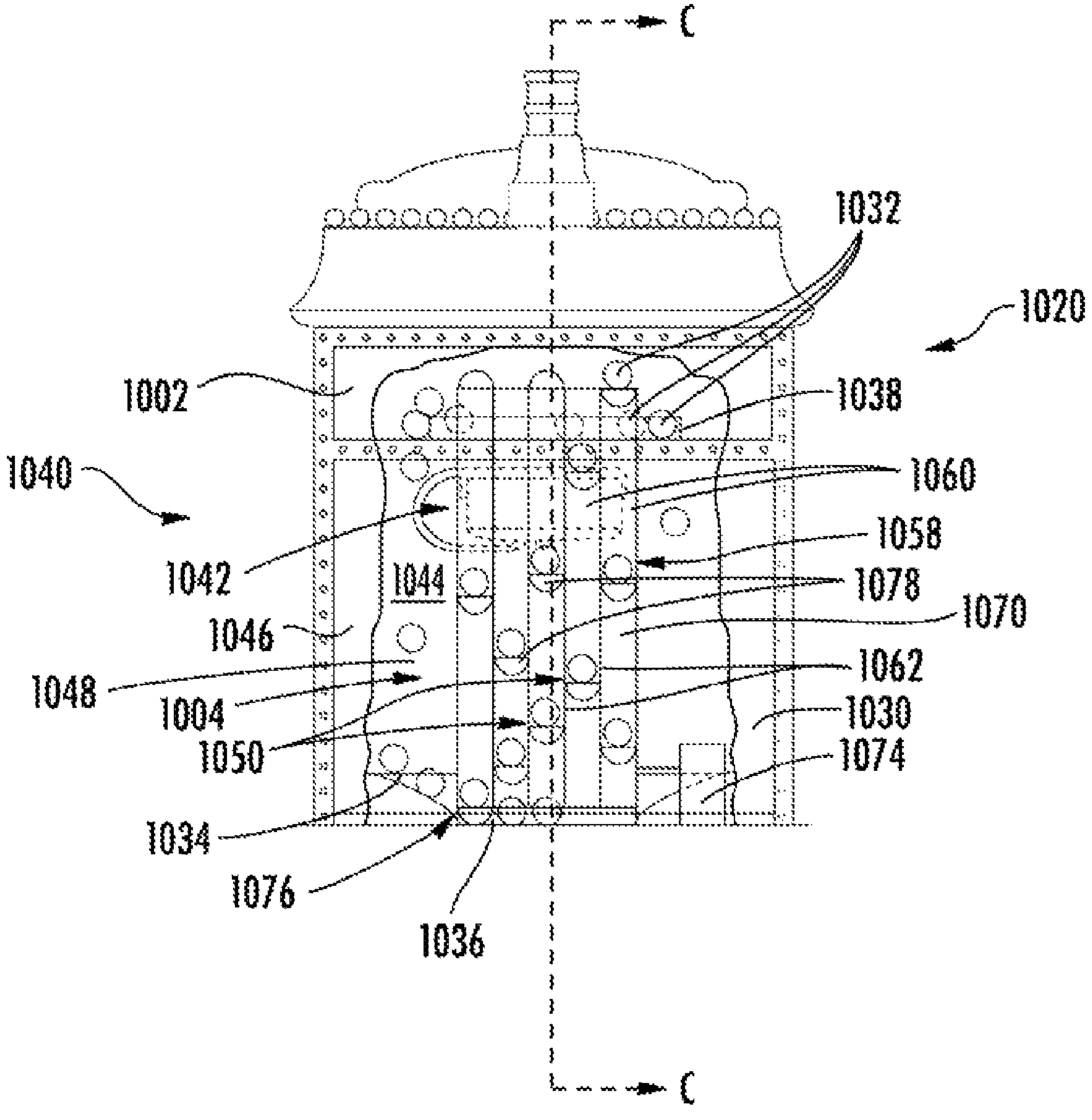
FIG. 13 is a partially cut-away rear elevational view of the jumbled ball display of FIG. 8 showing yet another embodiment of a transport device.
Figure 14:
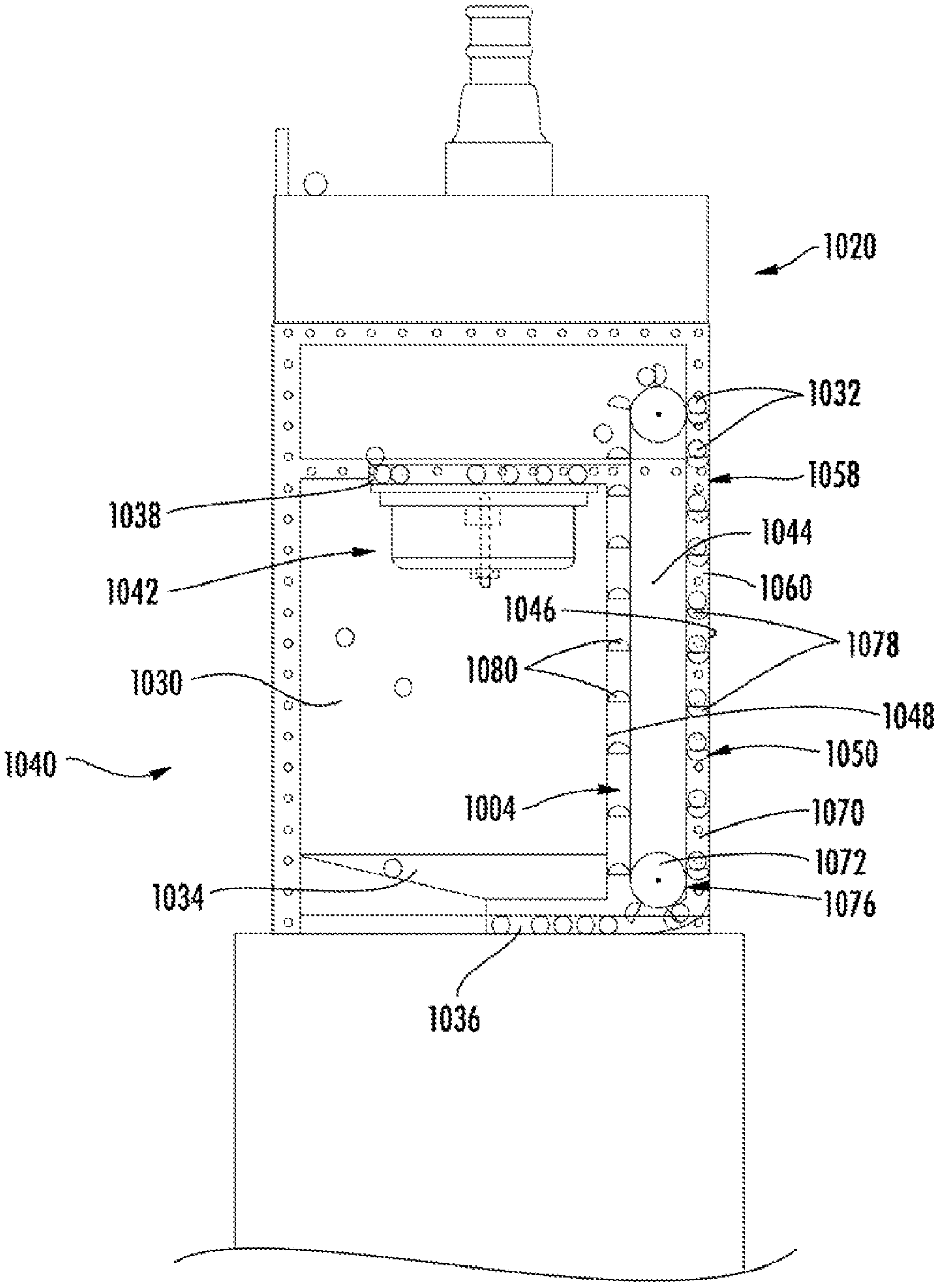
FIG. 14 is a cross-sectional view of FIG. 13 taken along line C-C.

FIGS. 13 and 14 show yet another embodiment of the transport device 1004 useful in the present invention typically extending substantially the length of the container 1030 and being provided with at least one transport component 1050, such as for example, cups, bowls, scoops, buckets, ledges, shovels or blades. Notably, the conveyor belt 1070 cooperates with rollers 1072 to rotate therearound when at least one of the rollers 1072 is activated by the motor 1074.

As further shown in FIGS. 13 and 14, the transport component 1050 cooperates with the transport device 1004 and is configured to receive the at least one display object 1032, for example, a ball, from the receptacle 1036. Here, transport component 1050 includes a plurality of cups 1078. If channels 1060 are present within the chute 1058, each cup 1078 is aligned with a designated channel 1060. Alternatively, it is understood that channels 1060 may be omitted with this type of transport device 1004.

Accordingly, each cup 1078 receives a display object 1032 from the receptacle 1036 and transports the object 1032 to the platform 1038. The display object 1032 eventually is received by the platform 1038 and an empty cup 1080 (FIG. 14) is allowed to return to the receptacle 1036 to retrieve another display object 1032. It is understood that a plurality of conveyor belts 1070 having transport components 1050 may be placed in a side-by-side arrangement to transport display objects 1032 to the platform 1038.

Figure 15A:
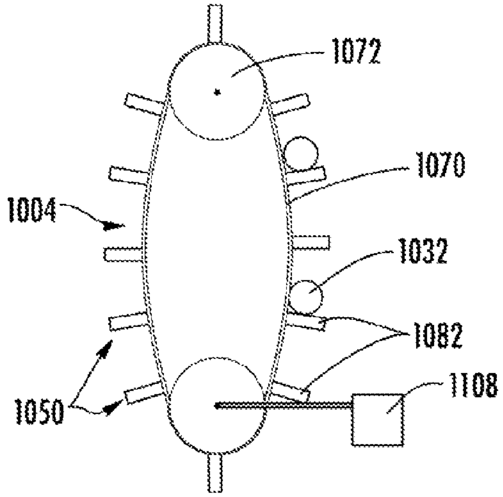
FIG. 15A is a cross-sectional view of another embodiment of a transport device useful in the present invention.
Figure 15B:
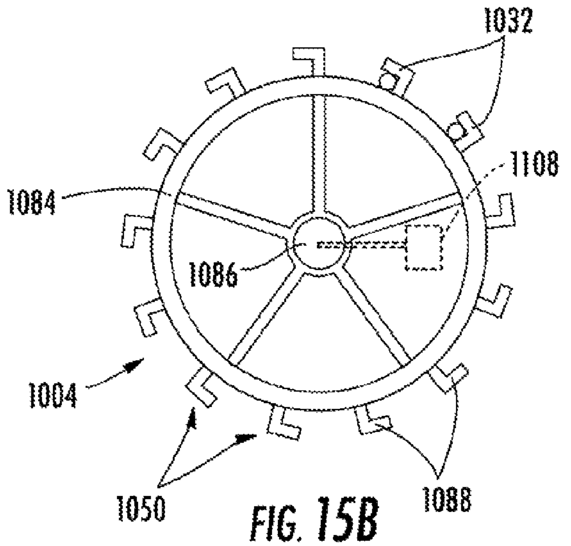
FIG. 15B is a cross-sectional view of another embodiment of a transport device useful in the present invention.
Figure 15C:
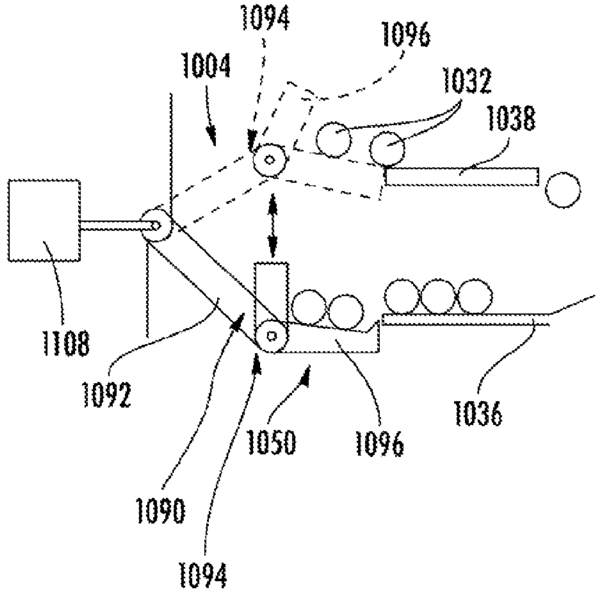
FIG. 15C is a cross-sectional view of another embodiment of a transport device useful in the present invention.
Figure 15D:
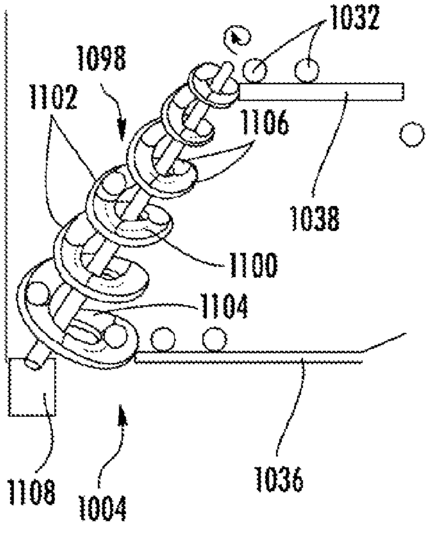
FIG. 15D is a perspective view of another embodiment of a transport device useful in the present invention.

FIGS. 15A-15D depict yet other embodiments of the transport device 1004 useful in the present invention. FIG. 15A shows the transport device 1004 including the conveyor belt 1070 cooperating with rollers 1072 and having ledges 1082 as the transport component 1050. FIG. 15B shows the transport device 1004 including a wheel 1084 disposed about a central axle 1086 and having buckets 1088 as the transport component 1050. FIG. 15C shows the transport device 1004 including a lift 1090 having a movable arm 1092. One end 1094 of the arm 1092 cooperates with the transport component 1050, a shovel 1096. FIG. 15D shows the transport device 1004 including an auger 1098 having a continuous blade 1100 as the transport component 1050. The continuous blade 1100 typically has ledges 1102 extending from a top surface 1104 of the blade 1100 to provide compartments 1106 to contain the display objects 1032 thereon. Accordingly, each transport device 1004 may be activated by a motor 1108 to transport the at least one display object 1032 from the receptacle 1036 to the platform 1038. It is further understood that the transport device 1004 may be substantially vertically oriented or non-vertically oriented.

Returning to FIG. 8, the present gaming device 1000 may provide a base game or bonus game cycle (for example, see FIGS. 2B and 21) associated with the selection of the one or more symbols 1018 from the plurality of symbols 1018 displayed by the display device 1020. The bonus game cycle (FIGS. 2B and 21) typically extends the length of play of a single game play and can be triggered by any number of bonus activating events (such as 726 in FIG. 21). This event may be many different types of events. For example, a bonus activating event simply may include the placing of a wager by the player or the displaying of a particular symbol 1018 such as, for example, a number, letter, picture or a combination thereof, on one or more reels. The bonus activating event also may be based on an external event. The bonus activating event triggers the gaming device 1000 to allow a player to participate in the bonus game. The bonus activating event may include any one of the above mentioned activating events and further may include when a player accumulates a number of symbols 1018 or game outcomes over a number of separate game plays.

In reference to FIG. 8, one such bonus activating event includes the displaying of a particular symbol(s) 1018, such as, for example, letters, words, numbers, pictures, images or combinations thereof, on one or more reels 1022 of slot machine 1006. For example, the bonus game cycle may be activated when the "popcorn container with popcorn" symbol 1018 appears on the third reel 1022 and on payline 1027 with the maximum wager being played. If the display device 1020 is a video display device (not shown), the symbols 1018 further may be displayed by animation.

After the occurrence of a bonus activating event, the transport device 1004 (FIGS. 9-15D) typically is activated, thereby allowing the display objects 1032 to be transported from the receptacle 1036 and to free fall from the platform 1038 (FIGS. 9-14). Next, the display device 1020 or bonus display 1024, typically a video display (not shown), provides a plurality of symbols 1018. Again, the symbols 1018 may include, for example, letters, words, numbers, pictures or images. In one embodiment, three different size popcorn symbols, for example, small, medium and large, may be displayed.

In one embodiment of an alternate game play, a player optionally may be allowed to select one or more symbols

1018 from the plurality of symbols 1018 using an input device, for example, a touch screen (not shown) or button(s) 1014 from selection panel 1113 (FIG. 8). It is understood that a controller (not shown) may select the player symbol(s) 1018 if a designated amount of time elapses. It is also understood that the controller may randomly select a symbol 1018, if the optional player selection is not provided.

Selection of at least one symbol 1018 from the plurality of symbols 1018 occurs with the assistance of a random number generator (not shown). The randomly selected symbol 1018, for example, different sized popcorn containers with popcorn, typically is associated with a number of symbols 1018 from which the controller may randomly select. It is understood that the symbol(s) 1018 from which the controller randomly selects may not be identical, but rather substantially equivalent, to the symbol(s) 1018 provided. More specifically, the symbol(s) 1018 provided may include, for example, a picture or image, while the symbol(s) 1018 randomly selected by the controller may include, for example, a letter or word, or vice-versa. By way of specific example, an image of a large-sized popcorn box may be provided while the controller may randomly select the word "Large Popcorn" such that the symbols 1018 are substantially equivalent, yet not exactly the same.

Once the controller has randomly selected one or more symbols 1018 from the plurality of symbols 1018, the symbol 1018 is displayed to the player via one or more of the display devices 1020. The controller will determine if the randomly selected symbol 1018 is substantially equivalent to the symbol 1018 previously selected by the player. If they are not substantially equivalent, deactivation of the transport device 1004 (FIGS. 9-15D) occurs and the bonus game cycle ends.

However, if the symbols 1018 selected by the controller and the player are substantially equivalent, the controller selects another symbol 1018 from a second plurality of symbols 1018. The symbol 1018 from the second plurality of symbols 1018 can include, for example, letters, words, numbers, pictures or images. In one embodiment, the symbol 1018 from the second plurality of symbols 1018 includes a prize symbol such as a prize ball (not shown) selected from the ball holder (not shown) wherein the prize balls represent different bonus award amounts and, optionally, multipliers, for example, 10, 15, 20, 25, 30, 35, 50, 75, 100, 250 and a 2x ball.

The controller then displays at least one symbol 1018 from the second plurality of symbols 1018 to the player, such as via the bonus display 1024 (see FIG. 8). As indicated above, an award is associated with symbol 1018 selected from the second plurality of symbols 1018 such that the controller awards a prize to the player and deactivates the transport device. By way of specific example, when a 2x ball (not shown) is displayed from the ball holder (not shown), the player is awarded 2x the accumulated bonus. If the player was entitled to only one randomly selected symbol, for example, a prize ball, from the second plurality of symbols, the player will receive 2x the top award (2×250)=500. If the player was entitled to two bonus balls, the second ball value is multiplied by 2x. If the second ball is also a 2x ball, the player will receive 4x (2x×2x) the top award (4×250)=1000. If the player was entitled to three bonus balls, and all three are a 2x ball, the player will receive 8x (2x×2x×2x=8) the top award ball (8×250)=2000. Accordingly, all awards may be multiplied by the total wager. After the prize(s) has been awarded, the transport device is deactivated and play of the primary game may be reinitiated.

If any actual prize is money, the amount of the prize may be added to the player's credit meter (not shown) or the prize may be dispensed from, for example, the coin dispenser 1015 (FIG. 8). Various types of prizes, besides monetary prizes, may be awarded. For example, the prizes may be goods, services or additional games. The goods and services may be awarded in the form of for example, physical objects, tickets, vouchers and coupons. Additional games may be presented in the form of tickets, such as scratch-off lottery tickets. In the embodiments in which tickets, vouchers or coupons are used, the objects are dispensed using an internally or externally mounted dispenser. Such dispensers are well known in the art.

Figure 16:
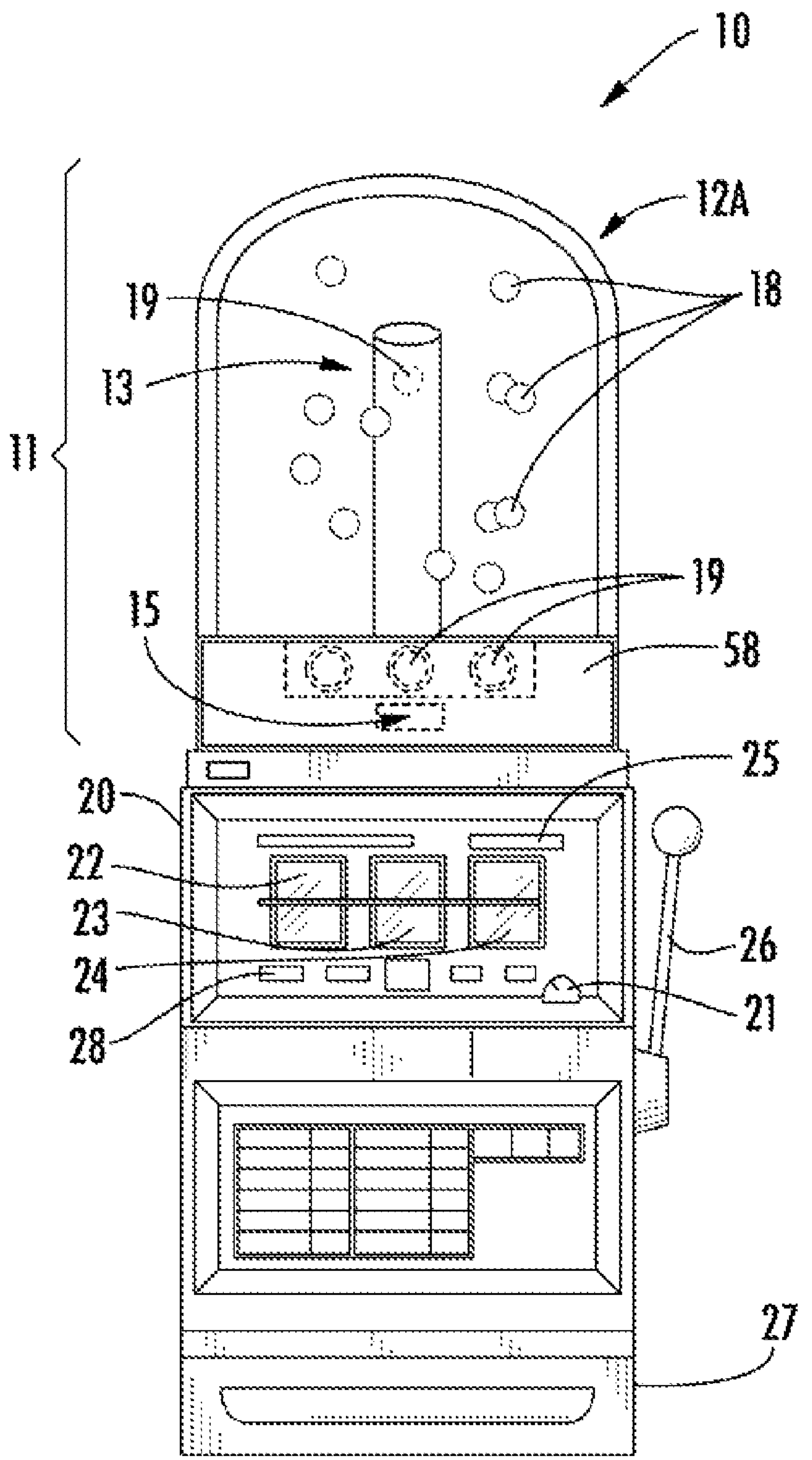
FIG. 16 is substantially a front perspective view of a gaming device of the present invention.

As shown in FIG. 16, one embodiment of a gaming device 10 of the present invention may involve a modified version of the display areas 11 and 1020 previously shown in FIGS. 1A and 8, respectively. In this embodiment, FIG. 16 shows gaming device 10 including display area 11, with domed display housing 12A and a game apparatus 20. Display area 11 comprises at least one prize object display 13 (shown here as a tubular exhibition container) and a plurality of display objects 18 (shown here as display balls, similar to 18 of FIG. 1A and 1032 of FIG. 8) disposed inside of housing 12A. Prize objects 19 are stored in an individually controlled manner in prize object holder 58 (located at base of housing 12A) as previously described (see discussion of holder 58 regarding FIGS. 2A, 2C and 3-7).

Game apparatus 20 may be any of a large number of devices that is configured to allow players to play a game (see previous discussions related to game apparatus 20 of FIG. 1A and slot machine 1006 of FIG. 8, for example). Elements 21-28 are analogous to elements 21-28 of FIG. 1A. Prize object display 13 is coupled to prize object holder 58. As described previously (see discussion related to FIG. 2A), prize object holder 58 may be made from a variety of materials, such as plastics, metals or composites, for example. Prize object holder 58 is typically hidden from view of the player.

Prize object display 13 is at least partially transparent allowing players to view selected prize objects 19 when they are moved into prize object display 13; prize object display 13 is made of a transparent material, such as plastic or glass. Suitable containers of this type may be obtained from Tripp Plastics of Reno, Nev. However, prize object display 13 also may be a wire cage of a type that is used in some Keno games. Although prize object display 13 is shown in the figures having a cylindrical shape, it is understood that prize object display 13 may also comprise other shapes, such as modified cylinders. For example, prize object display 13 may have the form of a tubular exhibition container, such as a cylindrical tower with a polygonal base (such as a triangular- or square-based cylinder), in addition to the conventional circular-based cylinder. Other polygon-based cylinders suitable for use as prize object displays in the present invention include, for example, pentagonal-, hexagonal- and octagonal-based cylinders. The prize object display may take the form of a spiral-shaped tube as well as the conventional straight tube. Typically, the prize object display (tubular exhibition container) may include a closure (such as a grate, web, plate, gate or pin, for example) at its top end so that the prize object may be retained within the confines of the prize object display.

In addition, the prize object display may be selected from one or more of the group consisting of an exhibition tube, a multi-segmented exhibition tube, a tube with an attached exhibition chamber, and a tube with an attached multi-segmented exhibition chamber. Examples of a multi-segmented exhibition tube may be found in the discussion of FIG. 18. An example of a tube with an attached exhibition chamber may include a straight tubular exhibition container with an attached spherical or rectangular chamber attached on top to hold and display the selected prize object. Similarly, a tube with an attached multi-segmented exhibition chamber may include a straight tubular exhibition container with a multi-segmented chamber (such as that shown in FIG. 18) attached in a T-configuration at the top to hold and display the selected prize object.

Prize object holder 58 may be further associated with prize object actuator 15 located below prize object holder 58 (FIG. 16). Typically, a selected prize object 19 is moved from the prize object holder 58 into prize object display 13 by activation of prize object actuators similar to the mechanisms described for moving prize objects (balls) from (ball) holder 58 in FIGS. 2A, 2C and 3-5B. In addition, prize object actuators may be selected from one or more of the group consisting of spring mechanisms, piston devices and gas injector mechanisms. Suitable gas injector mechanisms include, for example, pressurized air, blowers, and high speed fans.

Figure 17:
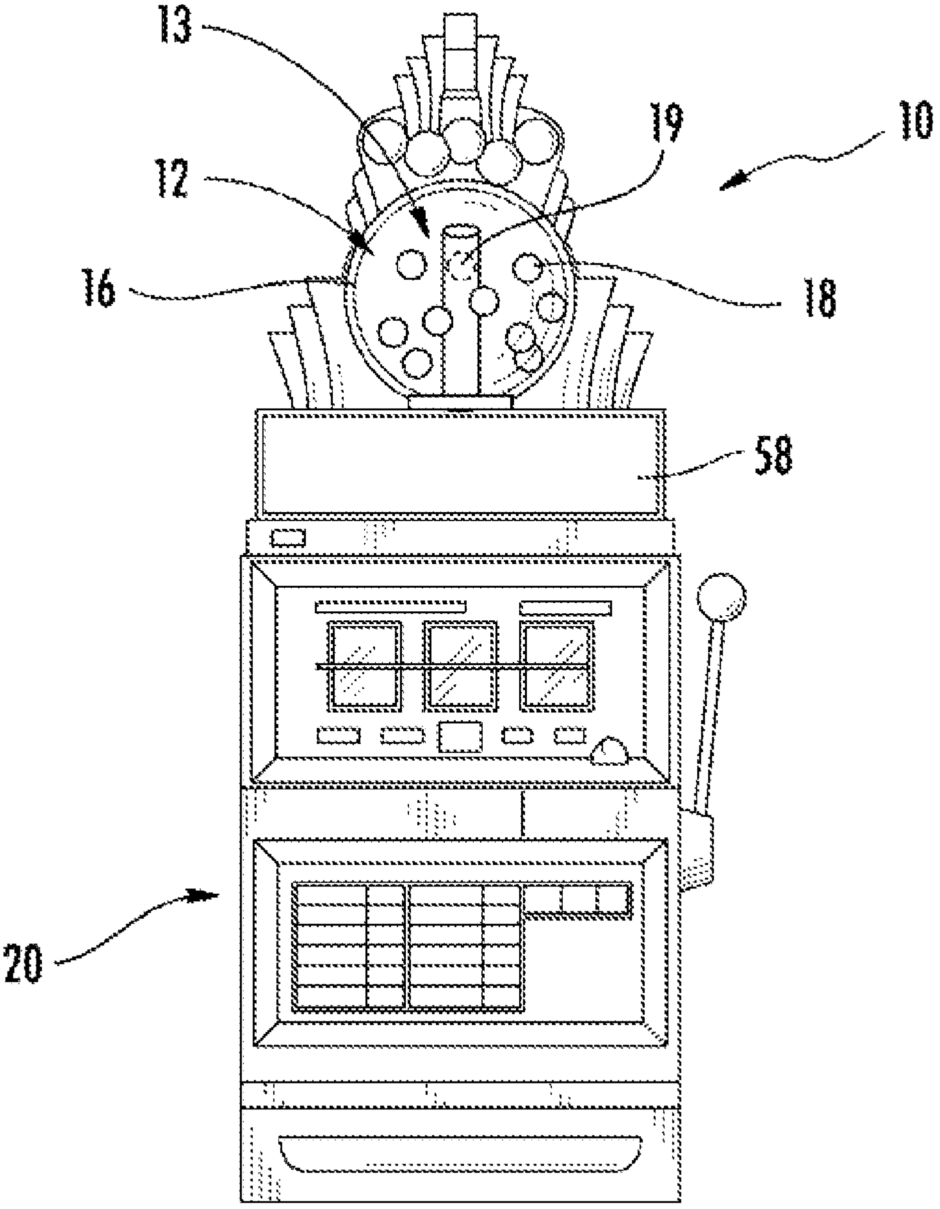
FIG. 17 is substantially a front view of a gaming device of the present invention having a spherical shaped container.

FIG. 17 shows another embodiment of the present invention where the container 16 (in place of housing 12A of FIG. 16) holding display objects 18 is in a spherical form and analogous to the jumbled ball display 12 of FIG. 1A. Prize object display 13 is located inside of container 16 and is shown with a selected prize object 19 displayed therein, the latter having been moved from prize object holder 58 into prize object display 13. Although the containers for holding display objects 18 and prize object displays 13 have been shown in spherical (FIG. 17) or dome-shaped (FIG. 16) forms, it is understand that other container shapes also may be used in context of the present invention, for example, polyhedral (such as diamond or rectangular), cylindrical or conical shapes.

In one method of game play, the game outcome is communicated to the player by moving a prize object 19 bearing game-related indicia thereon into a prize object display 13, where the prize object display 13 itself may be without any game-related indicia. In this case, the game outcome is communicated to the player by the selected prize object bearing specific indicia related to a prize.

Figure 18:
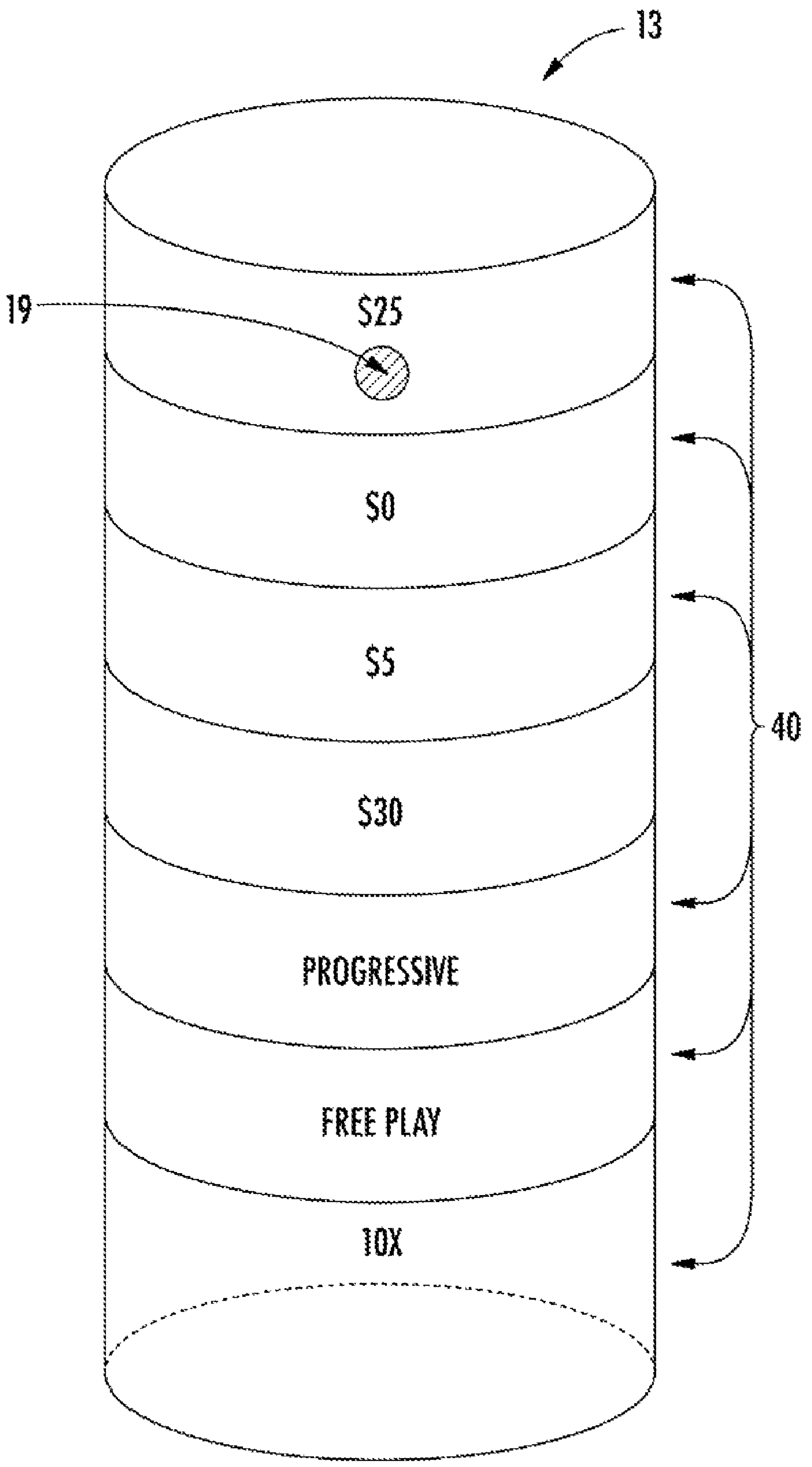
FIG. 18 is substantially an isolated front perspective view of a prize object display exemplified by a tubular exhibition container with game-related indicia.

In another method of game play, the game outcome may be communicated to the player by matching prize object 19 with a particular location or portion of prize object display 13. For example, as shown in FIG. 18, the various game-related indicia 40 on prize object display 13 convey the game outcome to the player when prize object 19 becomes associated with a specific game-related indicium 40. In one embodiment, the prize object displays 13 include segmenting mechanisms (not shown) configured to divide each prize object display into a plurality of compartments corresponding to the game-related indicia located on the prize object displays 13. The segmenting mechanism may comprise a plurality of constraining components configured to immobilize the movable display object after the movable display object is moved into the prize object display from the prize object holder.

Suitable constraining components of the segmenting mechanism include, for example, dividers and partitions that may be activated by a controller (not shown). For example, a controller may be in communication with the prize object actuator, prize object holder and the segmenting mechanism of prize object display 13, so that various constraining components of the segmenting mechanism are activated and coordinated with moving of prize object 19 from prize object holder 58 by the prize object actuator. Various sensors associated with prize object display 13 (located thereon and not shown) may be used to activate the segmenting mechanism and corresponding constraining components to immobilize prize object 19 in a designated compartment of prize object display 13, with the resultant combined location of prize object 19 and game-related indicium on prize object display 13 corresponding to the game outcome determined by the random number generator.

The segmenting mechanism and constraining components useful in the present invention may take a variety of forms, including for example, sliding plates, panels, screens and telescoping (extension) rods or bars, that are retracted inside the wall of prize object display 13 when not in use, but are configured to extend a short distance into the interior of prize object display 13 when activated. These components are typically positioned to extend perpendicularly (at right angles) from the wall of prize object display 13; however, other angles of extension may be used in order to capture and isolate prize object 19 in a designated compartment of prize object display 13. U.S. Patent Application Publication No. 2004/0002373 may be consulted for other representative examples of constraining components useful in gaming devices of the present invention.

Constraining components of the segmenting mechanism also may take other forms that do not involve physically constraining prize objects 19 by inserting partitioning components into the interior of prize object display 13 (as described above). For example, the interior wall of prize object display 13 may be configured so that receptacle sites are positioned at appropriate locations corresponding to game-related indicia. The receptacle sites may take the form of recessed or cup-shaped areas in the wall so that prize objects 19 may be captured and held in place.

Prize object detectors associated with the receptacle sites, and in communication with a controller, may be used to determine when a prize object 19 has been received by a receptacle site. For example, sensors, such as optical, electrical, inductive or magnetic sensors, may be used to detect the presence of a selected prize object 19 within a receptacle site. Suitable receptacle sites include, for example, suction devices and magnets. For example, in the case where prize object 19 may be made of, coated with, or contain a magnetic substance, selective activation of a magnet (receptacle site) attracts prize object 19 to a specific receptacle site (and game-related indicium location). Alternatively, the receptacle site may involve suction devices, for example, fans, vacuums, pneumatic pressure differential and other suitable devices for creating suction. In one embodiment, when the sensor detects presence of a selected prize object in the prize object display, the controller (in communication with the agitator) is configured to terminate agitation of the plurality of display objects in the container.

Alternatively, prize objects 19 may contain a magnetic or metallic substance and when prize object 19 is proximate to an activated inductive sensor, the metallic or magnetic substance in the ball may cause the inductance of the inductive sensor to change, thereby signaling the controller that a prize object 19 has "contacted" a designated game-related indicium on prize object display 13 corresponding to the game outcome. In this case, it is not required that prize object 19 be actually captured or isolated in prize object display 13 to signal a game outcome, it is only necessary that the prize object 19 has reached a certain location and been detected by the controller so that the game outcome can be communicated to the player.

Other sensing mechanisms may be used, including optical sensors such as bar code scanners, for example. Other systems may employ unique semiconductors, or other items, located inside prize objects 19; U.S. Pat. No. 5,799,940 may be consulted for descriptions of similar and related sensing mechanisms useful in gaming devices of the present invention. Unique transmitters, such as RFID (radio frequency identification) tags may also be placed inside prize objects 19.

Although the game-related indicia on the prize object displays are typically shown as markings represented by numbers, $ values, goods or services, multiplier factors, free plays and related prizes, the game-related indicia on the prize object display may also be presented to the player in the form of an LED (light emitting diode) meter. In this case, the LED meter also may be used as a changeable prize display where different prizes are flashed to the player before and during actual game play on the gaming device of the present invention, thus providing additional suspense and surprise for the player regarding the possible game outcomes.

Figure 19:
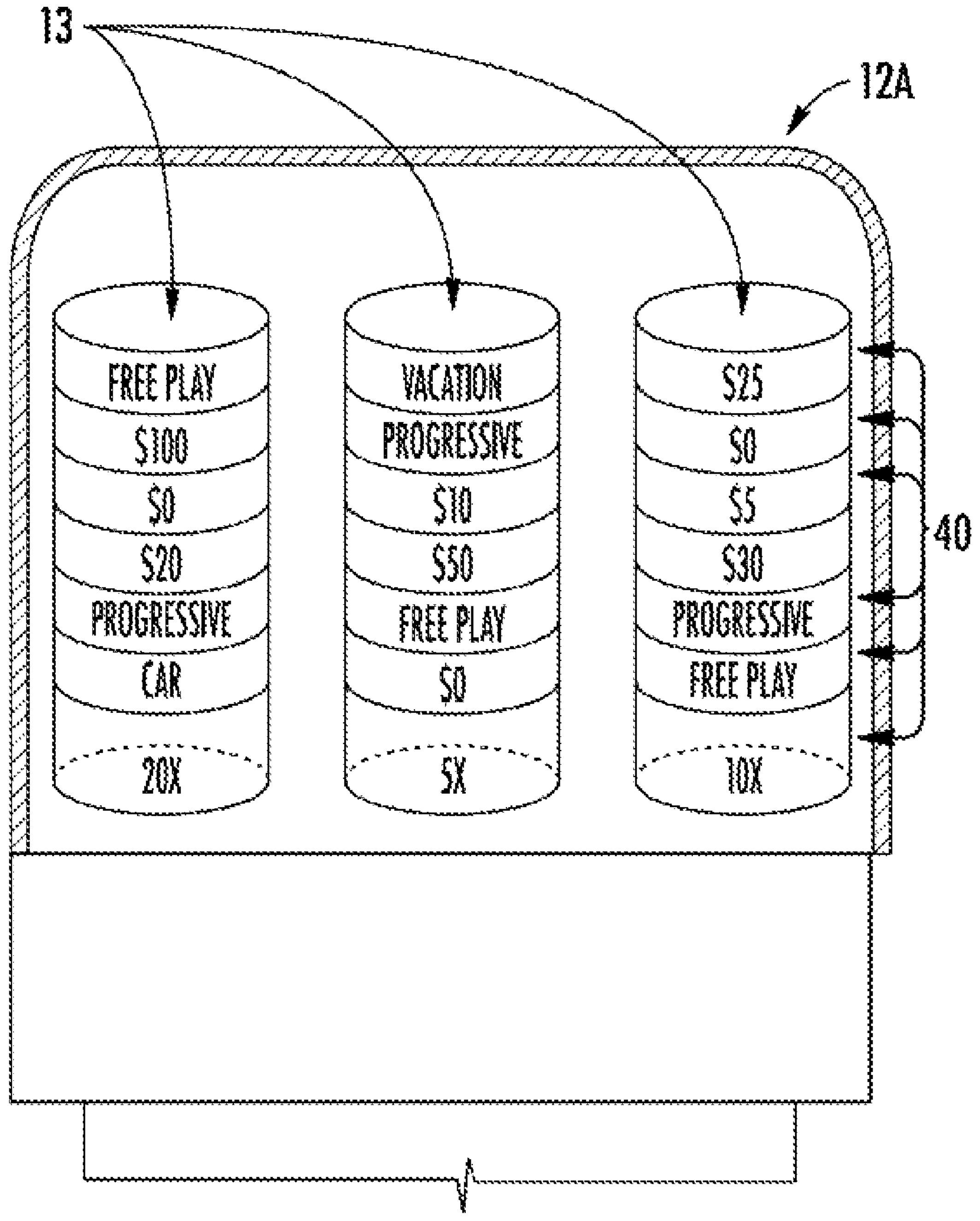
FIG. 19 is substantially a front perspective view of a portion of a gaming device of the present invention representing an isolated view of one embodiment having a plurality of prize object displays.

It is also understood that, although a single prize object display 13 is shown in FIGS. 16 and 17, a plurality of prize object displays 13 may be used in gaming devices of the present invention (see FIG. 19). When a plurality of prize object displays 13 is used, each of the prize object displays 13 may be associated with an individual prize object holder 58 and each of the prize object displays 13 may bear different game-related indicia 40 representing various game outcomes. In another embodiment, where three prize object displays 13 are part of the gaming device, all three prize object displays may have prize objects (balls) launched into each prize object display 13 as part of the game, and the game result would be the combination of game outcomes in all three prize object displays 13. Alternatively, only one of the three prize object displays 13 may have a prize object (ball) launched into the prize object display 13 to display the game outcome. This latter aspect can contribute to the surprise and enjoyment of the player due to the unforeseen nature of which prize object display 13 will be used to set forth the game outcome to the player.

In one embodiment (shown in FIG. 20) prize object actuator 15 is aligned with the base of each prize object display 13 and positioned under prize object holder 58 so that when a selected prize object 19 (not shown) is positioned in chamber 62, the prize object 19 may be impacted by prize object actuator 15 and moved or propelled into prize object display 13.

Figure 20:
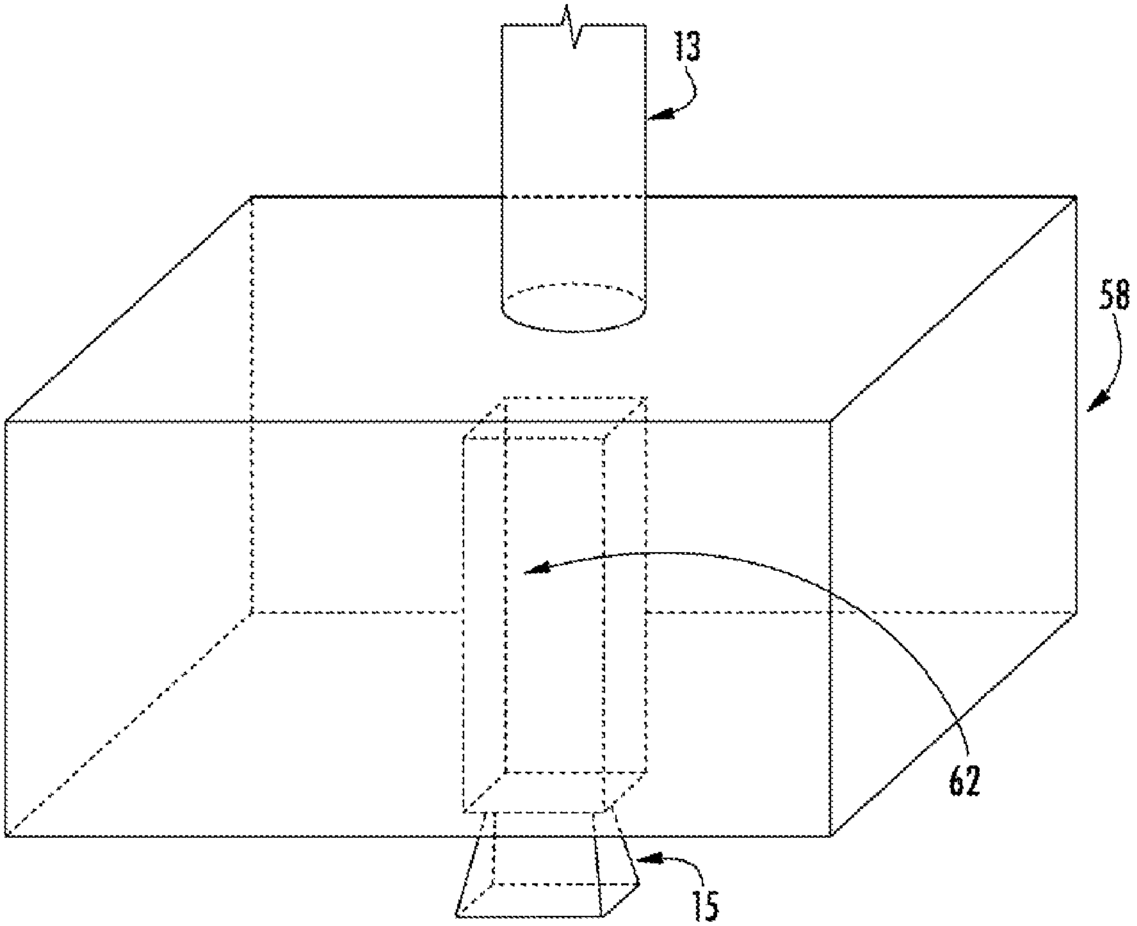
FIG. 20 is substantially a front perspective view of a selected portion of the gaming device highlighting the spatial relationship of the prize object actuator, the prize object display and the prize object holder.

Typically, prize object display 13 is positioned in an upright or substantially vertical position and prize object 19 (not shown) is moved straight up into prize object display 13 upon activation of prize object actuator 15 (FIG. 20). However, it is understood that prize object display 13 may positioned at other angles and various orientations relative to gaming apparatus 20. In the case where a plurality of prize object displays 13 is provided as part of display area 11, the prize object displays may be aligned parallel to each other (in a straight line or offset from each other) inside of containers 16 or 12A. However, it is understood that the present invention allows for other arrangements of multiple prize object displays, such as where the prize object displays are not configured parallel to each other, but may be tilted so that they point towards each other.

The player may be allowed to "select" a particular prize object display 13 from the plurality of prize object displays 13 prior to moving a prize object 19 from prize object holder 58. This manner of player selection is similar to that described below where a player is allowed to "select" a particular prize object 19 from the plurality of prize objects held in prize object holder 58 as part of the game play (use of player input device 90 and display 110 shown in FIG. 1A) prior to determination of the random game outcome and subsequent activation of the prize object actuator.

In one embodiment, input device 90 (see FIG. 1A) may be used to allow the player to "pre-select" a particular prize object 19 from the plurality of prize objects held in prize object holder 58. For example, when controller 76 (FIG. 2A) detects input device 90 being activated by a player, the controller may automatically initiate a display of available prize objects 19 held in prize object holder 58 by a presentation on display 110 (see FIG. 1A). The player may then select one of the prize objects 19 shown on display 110 by further activation of player input device 90 (or by interaction with display 110, see below). The next phase of the game then would be initiated and the player would be able to view the game outcome and see if the particular "pre-selection" of prize object 19 resulted in an enhanced winning result.

In another embodiment (similar to that presented in the discussion of FIG. 8), the player may be allowed to select a symbol or symbols from a list of symbols shown in display 110. In this case, display 110 may be presented in the form of a touch screen or keypad where the player may select the symbol by pressing the symbol with the player's finger. Other selection devices, such as buttons, may also be used. The symbols are meant to match the game-related indicia on the prize objects 19 available for movement into prize object display 13 upon initiation of game play. It is understood that inclusion of player input device 90 is optional and that game playing is contemplated that does not involve use of display 110 to allow the player to "pre-select" a particular prize object 19 before a prize object 19 is moved into prize object display 13.

Game Play Flow Chart

Figure 21:
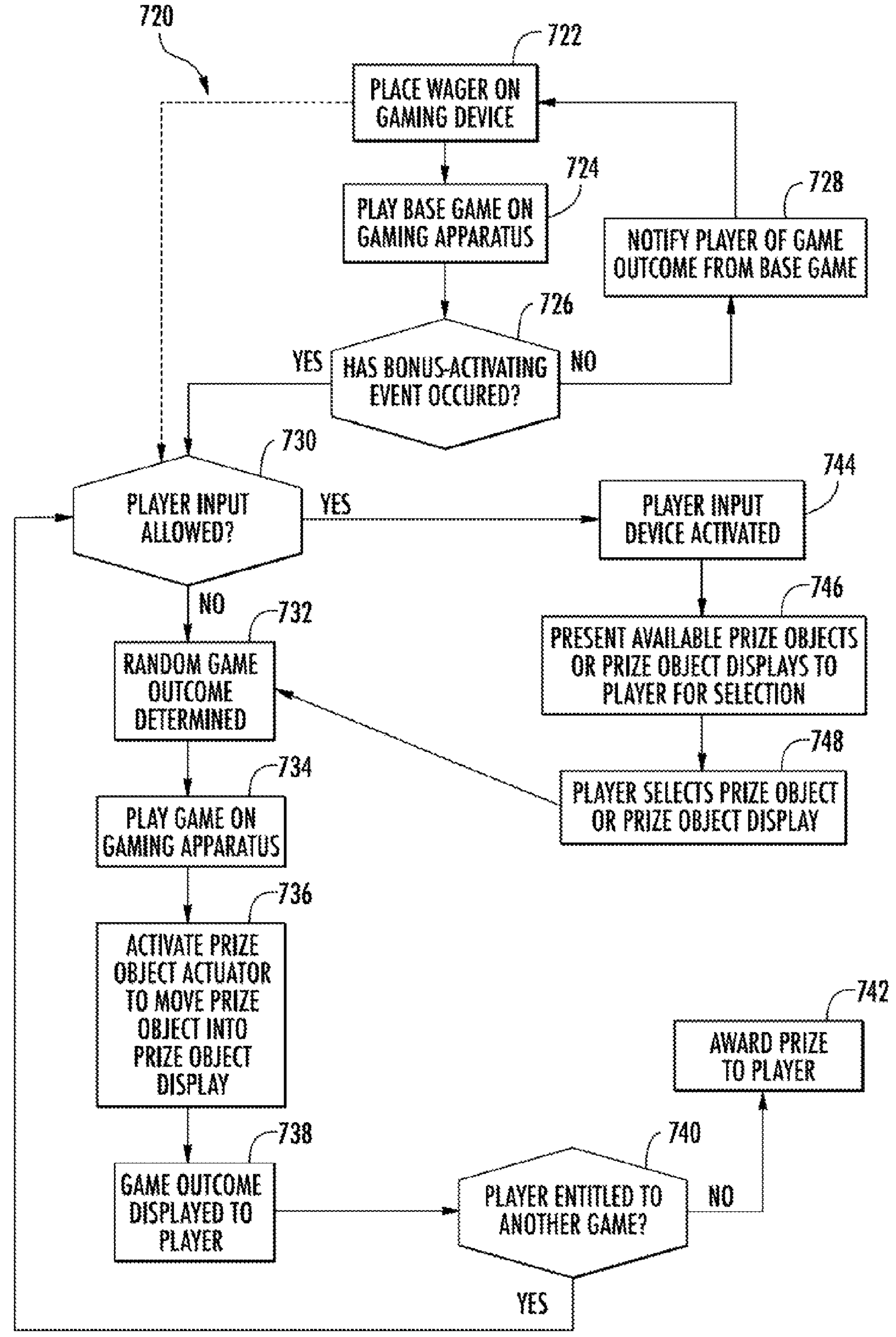
FIG. 21 is substantially a flowchart of a gaming method of the present invention.

Referring now to FIG. 21, a flowchart of a game play 720 involving possible bonus play is shown. At step 722, a player typically initiates game play 720 by placing a wager on the gaming device. The wager may be in form of cash or credit from actual domestic or foreign currency, vouchers, coupons, tickets, electronic cards and other sources or forms of wagers known in the art. Once the player initiates game play 720, the player may play a base game on the gaming apparatus at step 724. At step 726, the controller (not shown) detects the occurrence of a bonus-activating event. If the controller does not detect a bonus-activating event, then the controller notifies the player of the game outcome from the base game at step 728. The player may place a wager again and repeat steps 722 and 724 to continue playing a game on the gaming apparatus.

If the controller detects a bonus-activating event, the controller determines if the player is to be allowed to pre-select a prize object from the plurality of prize objects available in the prize object holder (58 in FIGS. 2A, 16 and 17) at step 730. If player input is allowed, the controller activates a player input device (90 in FIG. 1A, also included in the gaming devices of FIGS. 16-17, but not shown) for use by the player at step 744. The controller then presents the possible prize objects for selection to the player (step 746) and the player selects a prize object (step 748); alternatively, player "selection" may involve designating a specific prize object display 13 from several prize object displays 13 available on the gaming device. The game then proceeds to step 732 where a random game outcome is determined, followed by initiation of game play on the gaming apparatus at step 734.

If no player input was allowed at step 730, the game proceeds directly to steps 732 and 734. The bonus game is played (step 734) and the prize object actuator is activated to move the prize object into the prize object display at step 736. The game outcome is displayed to the player at step 738: for example, by matching of prize object 19 with the prize indicia 40 on prize object display 13 (see FIGS. 18-19) or by simple display of a prize object 19 bearing game-related indicia inside of a prize object display 13 without prize indicia 40. At step 740 the controller detects if the player is entitled to play another game as a result of the game outcome; if yes, the cycle repeats beginning at step 730. If no further game play is detected, the prize as a result of the game outcome is awarded to the player at step 742. The steps shown in the flowchart do not necessarily imply that the steps have to take place in a particular order. The order of steps may be varied; some steps may be eliminated; and, some steps may be replaced with other steps. Such variations still fall within the scope of the invention.

Although the flowchart in FIG. 21 outlines game play involving a bonus game, the same flowchart also may represent an embodiment of the present invention involving base game play without a bonus game. In this case, a player would initiate game play by placing a wager on the gaming device at step 722 and the game would proceed directly to step 730 (bypassing steps 724 and 726). The game would then proceed similarly to that described above in steps 732 through 748.

Gaming devices of the present invention may provide a base game cycle or a bonus game cycle similar to that previously discussed in relation to FIGS. 1A, 8 and the flowchart of FIG. 21. In the case of the present invention and for the purposes of the following discussion, however, it is understood that the jumbled ball display 12 (1002) of the gaming device 10 (1000) in FIG. 1A (8) would be replaced by the display areas and related components of FIGS. 16-17.

Figure 22:
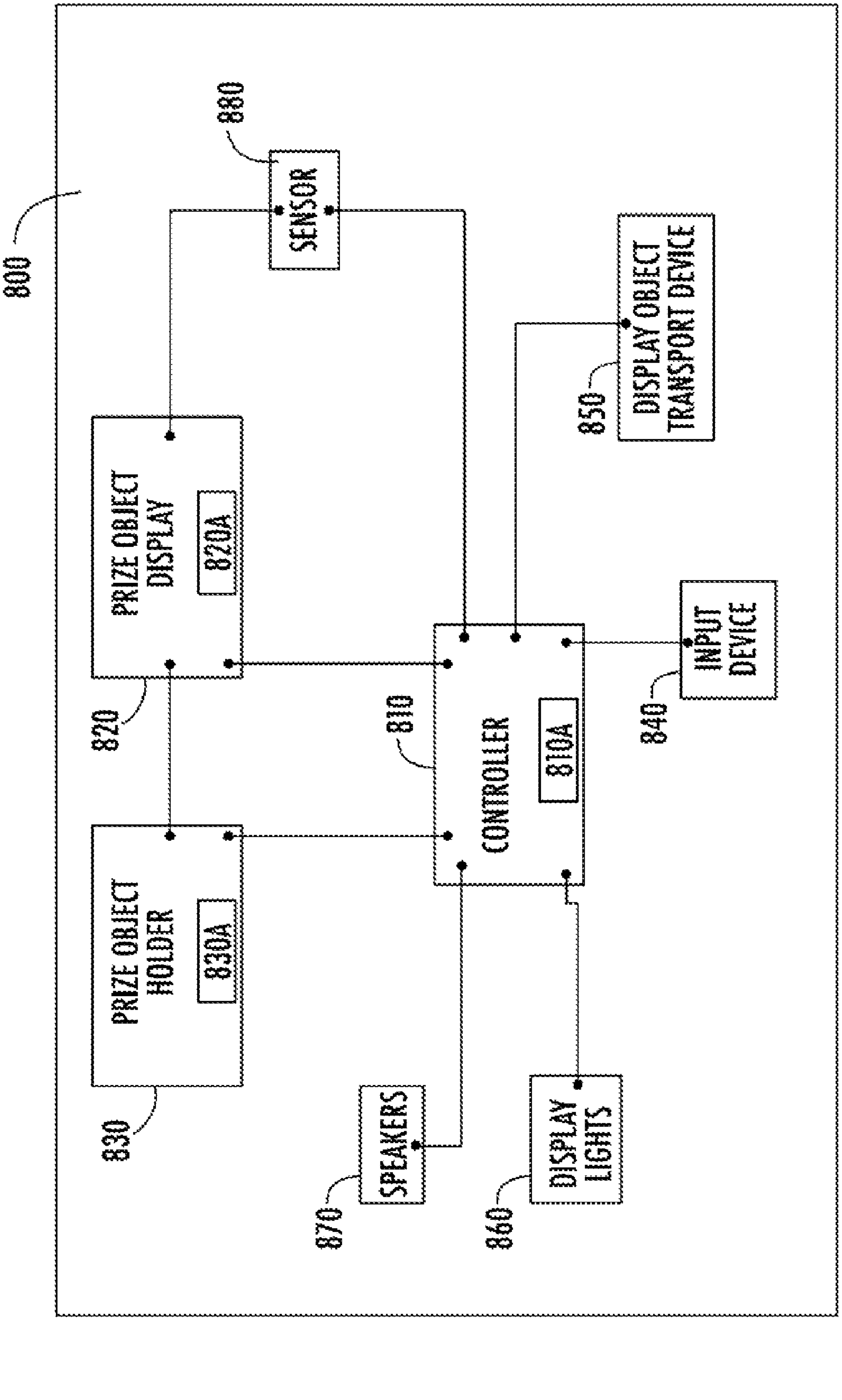
FIG. 22 is substantially a schematic representation of components of a gaming device of the present invention.

As shown in the schematic outline in FIG. 22, a gaming device 800 of the present invention may include a controller 810 which is configured to control the gaming device 800 by utilizing a random number generator 810A to produce random or pseudo random numbers for each base game or bonus game cycle. Typically, the controller 810 is configured to determine a random game outcome, subsequently select the prize object from the prize object holder and cause the selected prize object to be displayed in order to communicate the random game outcome to the player.

The outcome of a base game or a bonus game may be determined similarly to that previously presented in the discussion of FIGS. 1A, 2A and 21, for example. Controller 810 is provided in communication with (a) prize object display 820 (and associated optional segmenting mechanism 820A); (b) prize object holder 830 (and associated prize object actuator 830A) for randomly selecting at least one or more prize objects; (c) input device 840 (for example, a button, a keyboard or a touch screen display, such as that corresponding to 90 of FIG. 1A or button(s) 1014 of selection panel 1113 in FIG. 8), which may be configured to allow a player to select one or more symbols during a base game or bonus game cycle; and (d) display object transport device 850 (such as, for example, element 1004 in FIGS. 9-15D). Controller 800 is configured to activate and deactivate the transport device 850, to activate and deactivate the prize object actuator 830A and segmenting mechanism 820A, to detect any symbol(s) that optionally may be selected by a player, to display any selected symbols, to terminate the game and to award a prize to the player. The controller 810 may be one or more computers (not shown) or processor boards (not shown), and the controller 810 generally is configured to communicate with a display light(s) 860 and a speaker(s) 870 for visual and sound effects.

Controller 810 may be configured to detect when prize object display 820 contains a selected prize object. For example, a sensor 880 in communication with controller 810 may also be associated with the prize object display 820, whereby controller 810 is configured to detect when a selected prize object is contained within prize object display 820. The game may then be terminated, thus corresponding to different types of prizes to be awarded to a player. In a related embodiment, controller 810 may be in communication with display object transport device 850 where controller 810 is configured to terminate movement of the display objects within the display area after a predetermined time (time out mode) or after termination of the game.

In one embodiment, game play may include allowing the player the appearance of controlling selection of the prize object or prize object display (if more than one) via input device 840. This embodiment provides the illusion to the player that the selected prize object originates from the plurality of display objects. This form of player "selection" is similar to that previously described (see, for example, discussions relating to FIGS. 8 and 21).

Controller 810 also may be configured to generate and to detect when a bonus qualifying event occurs for activation of a bonus game cycle, which may include activating transport device 850 and determining which symbol(s) to display to the player via the random number generator 810A. For example, in an alternative use of sensor(s) 880, the controller 810 can detect and stop reels 22-24 (FIG. 1A) on gaming apparatus 20 when the symbols are in the desired position. When reels 22-24 (FIG. 1A) are in a bonus activating event position, the controller 810 will sense this position and begin the bonus game cycle. Sensor(s) 880 may also be provided external to the gaming device 800 to detect external bonus activating events. The controller 810 may also transmit and/or detect a variety of other information, such as when coins (not shown) or currency (not shown) have been inserted into a wage acceptor (such as elements 21 or 25 in FIG. 1A), when a game starts, when an error has occurred or when a sensor detects tampering.

Alternatively, when the controller 810 detects a bonus activating event, it may begin the bonus game cycle by activating, for example, the transport device 850, video screen(s) (not shown), display lights 860 or light emitting diodes (not shown). These devices may indicate that a player has qualified for the bonus game cycle and may prompt the player to perform an action. During the bonus game cycle, transport device 850 may transport and move the display objects within the display area.

Communication of the winning base/bonus game result involves selection and movement of a selected prize object from prize object holder 830 into prize object display 820, typically by activation of prize object actuator 830A. More specifically, prize objects may include, for example, keno balls, ping-pong balls or rubber balls, associated with a base game or bonus game cycle payout.

Game play operation involving use of prize object holder 830 and prize object display 820 is similar to that previously presented in the discussion regarding FIG. 21, for example. Typically, at least one of the prize objects may have a symbol that is capable of indicating a prize to be awarded to the player. Prize objects are stored in prize object holder 830 in an individually controlled manner so that individual prize objects may be selectively removed from the prize object holder, thus allowing specific prize objects with particular symbols or values to be individually manipulated and displayed when desired.

One of the advantages of providing the games described above is to increase the excitement and enjoyment of playing gaming device 10. Not only are the games entertaining to view, but they also increase the excitement and enjoyment experienced by players by offering large prizes. Each of the games can be configured to award large prizes because they are capable of producing low probability events from which the large prizes are awarded. In addition, the games may be configured for use as the primary game. Thus, game apparatus 20 may be completely replaced with the games of the present invention.

It can thus be seen that these embodiments can solve one or more problems associated with the prior art or provide advantages over prior art devices. Thus, embodiments of the present invention provide gaming devices that utilize highly visible display devices that may be used with primary games or bonus games. These embodiments also can provide display devices that eliminate environmental influences on the outcome of the game. These embodiments can, in addition, provide display devices that reduce the risk of tampering, require no human operators, and require little maintenance.

There are other features and advantages of one or more the various embodiments. They should be apparent to those skilled in the art based on the disclosure above. This may be accomplished in different ways. Although the description above contains many specifications, these should not be construed as limiting the scope of the invention but as merely providing illustrations of some of the presently preferred embodiments of this invention. This specification above, for instance, makes reference to bonus prizes. However, the present invention is not thereby intended to be limited to providing bonus prizes; rather it is intended that the present invention can, in certain embodiments, be used independently as a stand-alone game without necessarily including bonus game play. Thus, the scope of the invention should be determined by the claims as issued and their legal equivalents rather than by the examples given.

Accordingly, the present invention provides a gaming device including a container for holding display objects, a prize object holder for holding prize objects, and a prize object display positioned inside of the container for display of a selected prize object. Not only is the gaming device exciting and enjoyable to play, it may also increase the length of play experienced by players.

We claim:

1. A gaming device comprising:

(A) a plurality of display objects;

(B) a container configured to hold the plurality of display objects wherein at least a portion of the container is sufficiently transparent to allow a player to view contents of the container;

(C) an agitator configured to agitate the plurality of display objects;

(D) a plurality of prize objects;

(E) at least one prize object holder configured to hold the prize objects in an individually controlled manner;

(F) at least one prize object display located inside of the container and configured to receive at least one prize object from the prize object holder; and (G) a controller in communication with the prize object display wherein the controller is configured to select a prize object from the prize object holder and cause the selected prize object to be displayed in the prize object display.

2. The gaming device of claim 1 wherein the prize object display comprises at least one tubular exhibition container.

3. The gaming device of claim 1 further comprising at least one prize object actuator associated with the prize object holder configured to cause the selected prize object to move into the prize object display by activation of the prize object actuator.

4. The gaming device of claim 3 further comprising at least one player input device configured to allow the player to select a prize object from the plurality of prize objects in the prize object holder prior to activation of the prize object actuator.

5. The gaming device of claim 3 wherein the prize object actuator is selected from one or more of a spring mechanism, a piston device and a gas injector mechanism.

6. The gaming device of claim 1 wherein the prize object display comprises game-related indicia located thereon and wherein the game-related indicia are used to communicate a game outcome to the player.

7. The gaming device of claim 6 wherein the prize object display further comprises a segmenting mechanism configured to divide the prize object display into a plurality of compartments corresponding to the game-related indicia located thereon, and wherein the segmenting mechanism is in communication with the controller.

8. The gaming device of claim 1 wherein the plurality of prize objects comprise game-related indicia located thereon and wherein the game-related indicia are used to communicate a game outcome to the player.

9. The gaming device of claim 1 wherein the prize object display is selected from the group consisting of an exhibition tube, a multi-segmented exhibition tube, a tube with an attached exhibition chamber, and a tube with an attached multi-segmented exhibition chamber.

10. The gaming device of claim 1 further comprising a sensor associated with the prize object display wherein the sensor is configured to detect presence of the selected prize object in the prize object display.

11. The gaming device of claim 10 wherein the controller is in communication with the agitator and is configured to terminate agitation of the plurality of display objects in the container when the sensor detects presence of the selected prize object in the prize object display.

12. The gaming device of claim 1 wherein the container comprises a spherical shape.

13. The gaming device of claim 1 wherein the at least one prize object holder is hidden from view of the player.

14. The gaming device of claim 1 wherein the container and plurality of display objects comprise a jumbled ball display.

15. The gaming device of claim 1 wherein the controller is configured to determine a random game outcome and subsequently select the prize object from the prize object holder and cause the selected prize object to be displayed to communicate the random game outcome to the player.

16. The gaming device of claim 1 wherein the agitator comprises a display object transport device configured to move the plurality of display objects from a first area of the container to a second area of the container.

17. The gaming device of claim 16 wherein the display object transport device is selected from the group consisting of conveyor belts, discs, rollers, wheels, lifts, claws and augers.

18. The gaming device of claim 17 wherein the display object transport device further comprises at least one transport component configured to receive the display objects and wherein the at least one transport component is selected from the group consisting of cups, bowls, scoops, buckets, ledges, shovels and blades.

19. The gaming device of claim 1 wherein the selected prize object and the prize object display are configured to provide an illusion to the player that the selected prize object originates from the plurality of display objects.

20. The gaming device of claim 1 wherein the prize object display is positioned in a substantially vertical position within the container.

21. A method of playing a game comprising, but not all necessarily in order shown:

(A) providing a plurality of display objects in a container on a gaming device;

(B) storing a plurality of prize objects in an individually controlled manner on the gaming device;

(C) providing a prize object display located inside of the container on the gaming device;

(D) configuring the container to allow a player to view contents of the container;

(E) agitating the plurality of display objects in the container; and (F) determining a random game outcome and communicating the random game outcome to the player by selecting at least one of the plurality of prize objects and displaying the selected prize object to the player in the prize object display.

22. The method of claim 21 further comprising hiding the prize objects from view of the player while storing the prize objects.

23. The method of claim 21 wherein the selected prize object appears to originate from the plurality of display objects in the container.

24. The method of claim 21 comprising providing the display objects in the form of display balls and further jumbling the display balls in the container.

25. The method of claim 21 wherein agitating the plurality of display objects comprises activating a display object transport device to move display objects from a first area of the container to a second area of the container to provide an appearance of continuous motion of the plurality of display objects in the container.

26. The method of claim 21 further comprising allowing the player to apparently select the prize object from the plurality of prize objects in the prize object holder prior to determining the random game outcome and displaying the selected prize object in the prize object display.

27. A gaming device comprising:

(A) a plurality of display object means for entertaining a player;

(B) container means for holding the plurality of display object means and providing the player with view of contents of the container means;

(C) a plurality of prize object means for at least partially conveying a game outcome to the player;

(D) prize object holding means for storing the plurality of prize object means in an individually controlled manner; and (E) prize object display means for displaying a selected prize object means inside of the container means to convey the game outcome to the player.

28. The gaming device of claim 27 wherein the prize object holding means is configured to be hidden from view of the player.

29. The gaming device of claim 27 further comprising agitation means for agitating the display object means within the container means.

30. The gaming device of claim 29 wherein the agitation means comprise transport means for moving the display object means from a first area of the container means to a second area of the container means.

31. The gaming device of claim 27 further comprising controller means for determining the game outcome, selecting the prize object means, and causing the selected prize object means to be displayed in the prize object display means.

32. The gaming device of claim 27 further comprising illusion means for providing an illusion to the player that the selected prize object means originate from the plurality of display object means.

33. The gaming device of claim 27 further comprising prize object actuator means for causing the selected prize object means to move from the prize object holding means to, and be displayed in, the prize object display means.

* * * * *